US012615134B2

(12) United States Patent
Tie et al.

(10) Patent No.: US 12,615,134 B2
(45) Date of Patent: Apr. 28, 2026

(54) IDENTITY AUTHENTICATION METHOD AND APPARATUS, STORAGE MEDIUM, PROGRAM, AND PROGRAM PRODUCT

(71) Applicant: CHINA IWNCOMM CO., LTD., Xi'an (CN)

(72) Inventors: Manxia Tie, Xi'an (CN); Jun Cao, Xi'an (CN); Xiaolong Lai, Xi'an (CN); Xiaorong Zhao, Xi'an (CN); Qin Li, Xi'an (CN); Bianling Zhang, Xi'an (CN); Zhenhai Huang, Xi'an (CN); Xiang Yan, Xi'an (CN)

(73) Assignee: CHINA IWNCOMM CO., LTD., Xi'an (CN)

( * ) Notice: Subject to any disclaimer, the term of this patent is extended or adjusted under 35 U.S.C. 154(b) by 263 days.

(21) Appl. No.: 18/259,297

(22) PCT Filed: Dec. 21, 2021

(86) PCT No.: PCT/CN2021/140082
§ 371 (c)(1),
(2) Date: Jun. 26, 2023

(87) PCT Pub. No.: WO2022/135394
PCT Pub. Date: Jun. 30, 2022

(65) Prior Publication Data
US 2024/0064006 A1 Feb. 22, 2024

(30) Foreign Application Priority Data
Dec. 26, 2020 (CN) .......................... 202011569230.1

(51) Int. Cl.
*H04L 9/08* (2006.01)
*H04L 9/32* (2006.01)
*H04L 9/40* (2022.01)

(52) U.S. Cl.
CPC .......... *H04L 9/0825* (2013.01); *H04L 9/3247* (2013.01); *H04L 63/0823* (2013.01)

(58) Field of Classification Search
None
See application file for complete search history.

(56) References Cited

U.S. PATENT DOCUMENTS

2010/0009656 A1    1/2010  Pang
2011/0055561 A1    3/2011  Lai
(Continued)

FOREIGN PATENT DOCUMENTS

CN          1625103  A      6/2005
CN          1949709  A      4/2007
(Continued)

OTHER PUBLICATIONS

International Search Report in the international application No. PCT/CN2021/140082, mailed on Mar. 15, 2022. 2 pages.
(Continued)

*Primary Examiner* — Benjamin E Lanier
(74) *Attorney, Agent, or Firm* — Cooper Legal Group, LLC

(57) ABSTRACT

Disclosed is an identity authentication method. During the process of a requesting device authenticating the identity of an authentication access controller, confidentiality processing is performed on identity information that carries private and sensitive information, and identity authentication result information, thus private and sensitive information can be prevented from being exposed, such that an attacker cannot acquire private and sensitive information in a first authentication response message or an authentication result message even if they have intercepted same, thereby preventing an attack of an attacker on a legitimate authentication access controller, and ensuring the security of the authentication
(Continued)

access controller, the requesting device and even a network. Further disclosed are an identity authentication apparatus, a storage medium, a program, and a program product.

19 Claims, 9 Drawing Sheets

(56) References Cited

U.S. PATENT DOCUMENTS

| | | | |
|---|---|---|---|
| 2011/0067095 A1 | 3/2011 | Leicher | |
| 2012/0151554 A1 | 6/2012 | Tie | |
| 2017/0063843 A1 | 3/2017 | Vijayasankar | |
| 2017/0085557 A1 | 3/2017 | Hu | |
| 2017/0093752 A1* | 3/2017 | Mohaisen | H04L 47/808 |
| 2017/0279792 A1 | 9/2017 | Tse | |
| 2018/0302395 A1 | 10/2018 | Tse | |
| 2019/0245844 A1 | 8/2019 | Vijayasankar | |
| 2021/0152546 A1 | 5/2021 | Vijayasankar | |
| 2023/0032116 A1 | 2/2023 | Vijayasankar | |

FOREIGN PATENT DOCUMENTS

| | | | | |
|---|---|---|---|---|
| CN | 101631113 A | 1/2010 | | |
| CN | 104954130 A | 9/2015 | | |
| CN | 107948189 A | 4/2018 | | |
| KR | 20130103752 A | * 9/2013 | | H04L 63/08 |
| WO | WO-2011020279 A1 | * 2/2011 | | H04L 63/0823 |
| WO | 2011031272 A1 | 3/2011 | | |
| WO | WO-2011022915 A1 | * 3/2011 | | H04L 63/061 |

OTHER PUBLICATIONS

English translation of the Written Opinion of the International Search Authority in the international application No. PCT/CN2021/140082, mailed on Mar. 15, 2022. 4 pages.
Supplementary European Search Report in the European application No. 21909390.3, mailed on Apr. 15, 2024, 7 pages.

* cited by examiner

IDENTITY AUTHENTICATION METHOD AND APPARATUS, STORAGE MEDIUM, PROGRAM, AND PROGRAM PRODUCT

CROSS-REFERENCE TO RELATED APPLICATION

This application is filed based on and claims priority to Chinese Patent Application No. 202011569230.1, filed on Dec. 26, 2020 and entitled "IDENTITY AUTHENTICATION METHOD AND APPARATUS", the entire content of which is incorporated herein by reference in its entirety.

TECHNICAL FIELD

The present application relates to the technical field of network communication security, and particularly to a method and a device of identity authentication, a storage medium, a program, and a program product.

BACKGROUND

In a communication network, a requester may access the network through an authentication access controller. In some cases where security requirements are relatively high, the requester needs to authenticate the identity of the authentication access controller, so as to ensure that the accessed network is a legal network. Furthermore, node-to-node transmission in blockchain technology also requires that a trust relationship is established between different nodes, so that identity authentication performed on nodes is also very important.

During identity authentication performed for the authentication access controller, the authentication access controller needs to provide identity information thereof for the identity authentication. However, such identity information typically carries private or sensitive information such as geographic location information, information about an institution thereof, etc. Furthermore, during actual application, such identity information is usually comprised in a digital certificate of an entity, and the digital certificate is used as an identity certificate of the entity.

If the identity information of the authentication access controller is intercepted by an attacker during the identity authentication of the authentication access controller, and is used for illegal purposes, severe security risks are posed to the authentication access controller, the requester, and even the network.

SUMMARY

Provided in the present application are a method and a device of identity authentication, a storage medium, a program, and a program product. Confidentiality processing is performed on identity information and identity authentication result information, so that information such as a digital certificate, a verification result, or the like can be prevented from being exposed during transmission, and it is ensured that an attacker cannot acquire private or sensitive information, thereby ensuring the security of an authentication access controller, a requester, and even a network.

Provided in the embodiments of the present application is the following technical solution.

According to a first aspect, provided in an embodiment of the present application is a method of identity authentication, which includes the following operations.

An authentication access controller acquires a first authentication response message from a first authentication server trusted thereby, the first authentication response message including an identity authentication result information ciphertext and a digital signature of a second authentication server trusted by a requester. The identity authentication result information ciphertext is generated by the first authentication server by using a protection nonce to encrypt information comprising identity authentication result information of the authentication access controller, and the identity authentication result information includes a verification result of a digital certificate of the authentication access controller.

The requester acquires an authentication result message sent by the authentication access controller, the authentication result message including authentication result information that is obtained by the authentication access controller by using a message encryption key to encrypt to-be-encrypted data including the identity authentication result information ciphertext, the digital signature of the second authentication server, and the protection nonce. The requester uses the message encryption key to decrypt the authentication result information to obtain the protection nonce, the identity authentication result information ciphertext, and the digital signature of the second authentication server.

The requester uses a public key of the second authentication server to verify the digital signature of the second authentication server; after verification is successful, the requester uses the protection nonce to decrypt the identity authentication result information ciphertext to obtain identity authentication result information of the authentication access controller; and the requester determines an identity authentication result of the authentication access controller according to a verification result of the digital certificate in the identity authentication result information.

According to a second aspect, provided in an embodiment of the present application is a requester, which includes: a first acquisition portion, a decryption portion, a first verification portion, and a first determination portion.

The first acquisition portion is configured to acquire an authentication result message sent by the authentication access controller, the authentication result message comprising authentication result information that is obtained by the authentication access controller by using a message encryption key to encrypt to-be-encrypted data comprising an identity authentication result information cyphertext, a digital signature of a second authentication server trusted by the requester, and a protection nonce.

The identity authentication result information ciphertext is generated by a first authentication server trusted by the authentication access controller by using the protection nonce to encrypt information comprising identity authentication result information of the authentication access controller, and the identity authentication result information includes a verification result of a digital certificate of the authentication access controller.

The decryption portion is configured to use the message encryption key to decrypt the authentication result information to obtain the protection nonce, the identity authentication result information ciphertext, and the digital signature of the second authentication server.

The first verification portion is configured to use a public key of the second authentication server to verify the digital signature of the second authentication server.

The decryption portion is further configured to use the protection nonce to decrypt the identity authentication result information ciphertext to obtain the identity authentication result information of the authentication access controller when verification for the digital signature of the second authentication server is successful.

The first determination portion is configured to determine an identity authentication result of the authentication access controller according to the verification result of the digital certificate in the identity authentication result information.

According to a third aspect, provided in an embodiment of the present application is an authentication access controller, which includes: a first acquisition portion and a first sending portion.

The first acquisition portion is configured to acquire a first authentication response message sent by a first authentication server trusted by the authentication access controller, the first authentication response message including an identity authentication result information ciphertext and a digital signature of a second authentication server trusted by a requester. The identity authentication result information ciphertext is generated by the first authentication server by using a protection nonce to encrypt information comprising identity authentication result information of the authentication access controller, and the identity authentication result information includes a verification result of a digital certificate of the authentication access controller.

The first sending portion is configured to send an authentication result message to the requester, the authentication result message including authentication result information that is obtained by the authentication access controller by using a message encryption key to encrypt to-be-encrypted data comprising the identity authentication result information ciphertext, the digital signature of the second authentication server, and the protection nonce.

According to a fourth aspect, provided in an embodiment of the present application is a first authentication server, trusted by an authentication access controller, which includes: a first acquisition portion, a decryption portion, a first verification portion, and a generation portion.

The first acquisition portion is configured to acquire a first authentication request message sent by the authentication access controller, the first authentication request message including an identity information ciphertext that is obtained by the authentication access controller by using a public key of an encryption certificate to encrypt information including the digital certificate of the authentication access controller and the protection nonce.

The decryption portion is configured to use a private key corresponding to the encryption certificate to decrypt the identity information ciphertext to obtain the digital certificate and the protection nonce.

The first verification portion is configured to perform legality verification on the digital certificate to obtain a verification result of the digital certificate of the authentication access controller.

The generation portion is configured to generate identity authentication result information of the authentication access controller according to information including the verification result, and further configured to use the protection nonce to encrypt information comprising the identity authentication result information to generate the identity authentication result information cyphertext, and perform calculation on to-be-signed data including the identity authentication result information ciphertext to generate a digital signature of the first authentication server.

According to a fifth aspect, provided in an embodiment of the present application is a requester, including:
a first processor; and
a first memory for storing instructions executable by the first processor.

The first processor is configured to invoke the instructions stored in the first memory to perform steps performed by the requester in the method of identity authentication according to the first aspect.

According to a six aspect, provided in an embodiment of the present application is an authentication access controller, including:
a second processor; and
a second memory for storing instructions executable by the second processor.

The second processor is configured to invoke the instructions stored in the second memory to perform steps performed by the authentication access controller in the method of identity authentication according to the first aspect.

According to a seventh aspect, provided in an embodiment of the present application is a first authentication server, including:
a third processor; and
a third memory for storing instructions executable by the third processor.

The third processor is configured to invoke the instructions stored in the third memory to perform steps performed by the first authentication server in the method of identity authentication according to the first aspect.

According to an eighth aspect, further provided in an embodiment of the present application is a computer-readable storage medium, having a computer program stored thereon, the computer program performing, when run by a processor, steps performed by the authentication access controller, the requester, or the first authentication server in the method of identity authentication according to the first aspect.

According to a ninth aspect, provided in an embodiment of the present application is a computer program, comprising computer-readable codes. When the computer-readable codes are run in a computer device, a processor in the computer device performs steps performed by the authentication access controller, the requester, or the first authentication server in the method of identity authentication according to the first aspect.

According to a tenth aspect, provided in an embodiment of the present application is a computer program product, including computer program instructions, the computer program instructions causing a computer to perform steps performed by the authentication access controller, the requester, or the first authentication server in the method of identity authentication according to the first aspect.

According to the above technical solution, during identity authentication performed for an authentication access controller by a requester, confidentiality processing is performed on identity information carrying private or sensitive information and identity authentication result information, so that even if an attacker intercepts an exchanged message during transmission, the attacker cannot acquire the private or sensitive information therein, thereby preventing the attacker from focusing on attacking a legal authentication access controller, and ensuring the security of an authentication access controller, a requester, and even a network.

BRIEF DESCRIPTION OF THE DRAWINGS

In order to describe the technical solutions in the embodiments of the present application or in the prior art more clearly, accompanying drawings to be used for description of the embodiments or the prior art will be briefly introduced below. It is apparent that the accompanying drawings in the following description are merely some embodiments of the present application. Those of ordinary skill in the art can further obtain other accompanying drawings according to these accompanying drawings without the exercise of creative effort.

DETAILED DESCRIPTION

Figure 1:
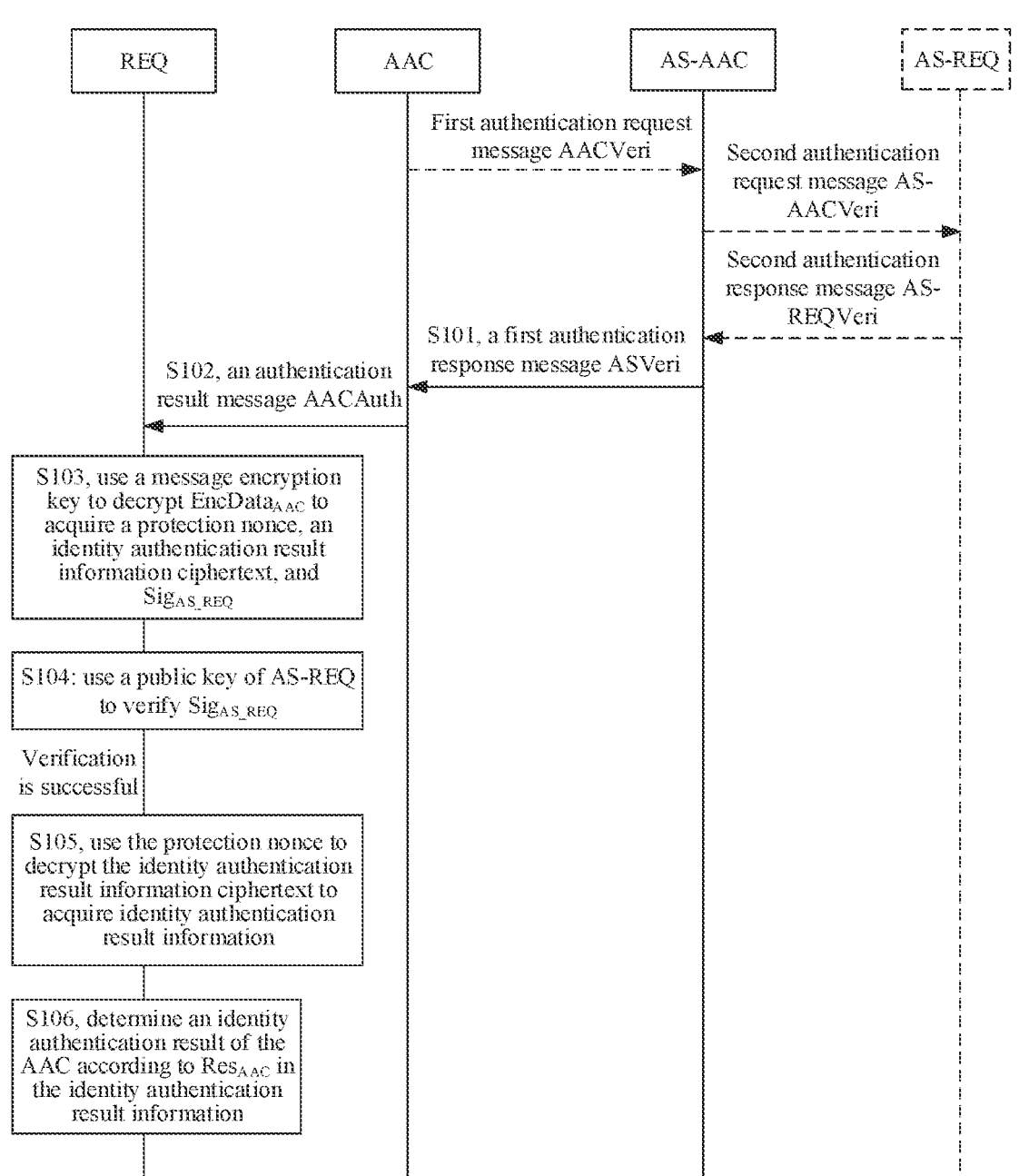
FIG. 1 is a schematic diagram of a method of identity authentication according to an embodiment of the present application.

In a communication network, a requester may access the network through an authentication access controller. In order to ensure that the network accessed by the requester is a legal network, the requester needs to authenticate the identity of the authentication access controller.

Current wireless communication and mobile communication scenarios are used as an example. In a scenario where a requester accesses a wireless network through an authentication access controller, the requester may be a terminal device such as a mobile phone, a personal digital assistant (PDA), a tablet computer, or other terminal devices, and the authentication access controller may be a network side device such as a wireless access point, a wireless router, or other network side devices. In a scenario where a requester accesses a wired network through an authentication access controller, the requester may be a terminal device such as a desktop computer, a notebook computer, or the like, and the authentication access controller may be a network side device such as a switch, a router, or the like. In a scenario where a requester accesses a network of the 4th/5th generation mobile communication technology (abbreviated as 4G/5G) by an authentication access controller, the requester may be a terminal device such as a mobile phone, a tablet computer, or the like, and the authentication access controller may be a network side device such as a base station or the like. Certainly, the present application is likewise applicable to various data communication scenarios such as other wired networks, near field communication networks, and the like.

However, during identity authentication performed for the authentication access controller, the authentication access controller needs to provide identity information thereof for the identity authentication. The identity information is usually comprised in a digital certificate of the authentication access controller, and carries private or sensitive information. If an attacker intercepts the private or sensitive information in the digital certificate, severe security risks are posed to the authentication access controller, the requester, and the network.

To address the above technical problem, provided in an embodiment of the present application is a method of identity authentication. An authentication access controller acquires, from a first authentication server trusted thereby, a first authentication response message including an identity authentication result information ciphertext and a digital signature of a second authentication server trusted by a requester. The identity authentication result information ciphertext is generated by the first authentication server by using a protection nonce to encrypt information including identity authentication result information of the authentication access controller, and the identity authentication result information carries private or sensitive information. Confidentiality processing is performed on the identity authentication result information by the protection nonce, thereby ensuring the security of transmission of the identity authentication result information between the authentication server and the authentication access controller. Then, the authentication access controller sends an authentication result message to the requester. The authentication result message includes authentication result information that is obtained by the authentication access controller by using a message encryption key to encrypt to-be-encrypted data including the identity authentication result information ciphertext, the digital signature of the second authentication server, and the protection nonce, thereby ensuring the security of transmission of the private or sensitive information. Then, the requester uses the message encryption key to decrypt the authentication result information to obtain the protection nonce, the identity authentication result information ciphertext, and the digital signature of the second authentication server. The requester verifies the digital signature of the second authentication server, and after verification is successful, the requester uses the protection nonce to decrypt the identity authentication result information ciphertext to obtain the identity authentication result information of the authentication access controller, and the requester determines an identity authentication result of the authentication access controller according to the authentication result information. Confidentiality processing is performed on identity information and identity authentication result information, thereby protecting private or sensitive information, preventing an attacker from focusing on attacking a legal authentication access controller, and ensuring the security of an authentication access controller, a requester, and a network.

The above are merely examples of the requester, the authentication access controller, and the authentication server, and are not limitations set on the requester, the authentication access controller, and the authentication server. In other possible implementations of the embodiments of the present application, the requester, the authentication access controller, and the authentication server may also be other devices.

The method of identity authentication provided in the embodiment of the present application is used for unilateral identity authentication of the authentication access controller by the requester (AAC Authentication with an Unauthenticated REQ (AAUR)).

For ease of description, in the embodiments of the present application, the method of identity authentication of the present application will be described by using a requester (REQ), an authentication access controller (AAC), and an authentication server (AS) as an example.

An AS trusted by an AAC is referred to as a first authentication server AS-AAC. An AS trusted by an REQ is referred to as a second authentication server AS-REQ. AS-AAC and AS-REQ each hold a digital certificate that complies with specifications of ISO/IEC 9594-8/ITU X.509, other standards, or other technical systems, and a private key corresponding to the digital certificate, and AS-AAC has the capability of verifying the legality of a digital certificate of an AAC. When AS-AAC and AS-REQ are two different authentication servers. AS-AAC and AS-REQ trust each other, and know the digital certificate of each other or the public key in each other's digital certificate. A Certificate Sever-Decrypt (CS-DEC) holds an encryption certificate that complies with specifications of ISO/IEC 9594-8/ITU X.509, other standards, or other technical systems, and a private key corresponding to the encryption certificate. The CS-DEC may be a stand-alone server, or may be reside in AS-AAC.

The REQ may be an end point participating in an identity authentication process, is connected to the AAC, accesses a service provided by the AAC, and accesses the AS through the AAC. The REQ knows the digital certificate of AS-REQ trusted thereby or a public key in the digital certificate. The AAC may be another end point participating in the identity authentication process, is connected to the REQ, provides a service and communicates with the REQ, and can access AS-AAC directly. The AAC holds a digital certificate that complies with specifications of ISO/IEC 9594-8/ITU X.509, other standards, or other technical systems, and a private key corresponding to the digital certificate, and knows the encryption certificate of the CS-DEC or a public key in the encryption certificate.

A method of identity authentication provided in an embodiment of the present application will be described below with reference to FIG. 1. The method includes the following operations.

In S101, an AAC acquires a first authentication response message ASVeri from AS-AAC trusted thereby.

The ASVeri includes an identity authentication result information ciphertext and a digital signature $Sig_{AS\_REQ}$ of AS-REQ trusted by a REQ. The identity authentication result information ciphertext is generated by AS-AAC by using a protection nonce to encrypt information including identity authentication result information of the AAC. The identity authentication result information includes a verification result $Res_{AAC}$ of verification for a digital certificate $Cert_{AAC}$ of the AAC. $Res_{AAC}$ is obtained after AS-AAC verifies the legality of $Cert_{AAC}$. $Sig_{AS\_REQ}$ is a digital signature generated by AS-REQ by performing calculation on other fields before $Sig_{AS\_REQ}$ in ASVeri.

It should be noted that if AS-AAC trusted by the AAC and AS-REQ trusted by the REQ are the same authentication server, that is, in the case of non-roaming, the authentication server trusted by both the REQ and the AAC may be represented by AS-AAC (or by AS-REQ). In this case, before the AAC acquires ASVeri, the AAC may send a first authentication request message AACVeri to AS-AAC (which may also be represented by AS-REQ). The AACVeri includes an identity information ciphertext $EncPub_{AS}$. The $EncPub_{AS}$ is obtained by the AAC by using a public key of an encryption certificate to encrypt information including $Cert_{AAC}$ and the protection nonce. AS-AAC (which may also be represented by AS-REQ) may use a private key corresponding to an encryption certificate of a Certificate Sever-Decrypt (CS-DEC) residing in AS-AAC (which may also be represented by AS-REQ) to decrypt $EncPub_{AS}$ to obtain $Cert_{AAC}$ and the protection nonce. Alternatively. AS-AAC (which may also be represented by AS-REQ) may send $EncPub_{AS}$ to a stand-alone CS-DEC having an interactive and trust relationship therewith for decryption, acquire $Cert_{AAC}$ and the protection nonce obtained by means of decryption, then verify legality of $Cert_{AAC}$ to obtain a verification result $Res_{AAC}$, generate identity authentication result information of the AAC according to information including $Res_{AAC}$, use the protection nonce to encrypt information including the identity authentication result information to generate an identity authentication result information ciphertext, perform calculation on to-be-signed data including the identity authentication result information ciphertext to generate a digital signature $Sig_{AS\_AAC}$ (which may also be $Sig_{AS\_REQ}$) of AS-AAC (which may also be represented by AS-REQ), generate a first authentication response message ASVeri according to information including the identity authentication result information ciphertext and $Sig_{AS\_AAC}$ (which may also be represented by $Sig_{AS\_REQ}$), and send the ASVeri to the AAC.

If AS-AAC trusted by the AAC and AS-REQ trusted by the REQ are two different authentication servers, that is, in the case of roaming, before the AAC acquires ASVeri, the AAC may send a first authentication request message AACVeri to AS-AAC. The AACVeri includes an identity information ciphertext $EncPub_{AS}$. The $EncPub_{AS}$ is obtained by the AAC by using a public key of an encryption certificate to encrypt information including $Cert_{AAC}$ and the protection nonce. AS-AAC may use a private key corresponding to an encryption certificate of a certificate sever-decrypt (CS-DEC) residing in AS-AAC to decrypt $EncPub_{AS}$ to obtain $Cert_{AAC}$ and the protection nonce. Alternatively, AS-AAC may send $EncPub_{AS}$ to a CS-DEC having an interactive and trust relationship therewith for decryption, acquire $Cert_{AAC}$ and the protection nonce that are obtained by means of decryption, verify legality of $Cert_{AAC}$ to obtain $Res_{AAC}$, generate identity authentication result information of the AAC according to information including $Res_{AAC}$, use the protection nonce to encrypt information including the identity authentication result information to generate an identity authentication result information ciphertext, perform calculation on to-be-signed data including the identity authentication result information ciphertext to generate a digital signature $Sig_{AS\_AAC}$ of AS-AAC, and send a second authentication request message AS-AACVeri to AS-REQ. The AS-AACVeri includes the identity authentication result information ciphertext and the $Sig_{AS\_AAC}$, AS-REQ uses a public key of AS-AAC to verify the $Sig_{AS\_AAC}$, performs, after verification is successful, calculation on to-be-signed data including the identity authentication result information ciphertext to generate a digital signature $Sig_{AS\_REQ}$ of AS-REQ, and sends a second authentication response message AS-REQVeri to AS-AAC. The AS-REQVeri includes the identity authentication result information ciphertext and the $Sig_{AS\_REQ}$. AS-AAC generates a first authentication response message ASVeri according to information including the identity authentication result information ciphertext and the $Sig_{AS\_REQ}$, and sends the ASVeri to the AAC.

In S102, an REQ acquires an authentication result message AACAuth sent by the AAC.

AACAuth includes authentication result information $EncData_{AAC}$. $EncData_{AAC}$ is obtained by the AAC by using a message encryption key and using a symmetric encryption algorithm to encrypt to-be-encrypted data including the identity authentication result information ciphertext, the digital signature $Sig_{AS\_REQ}$ of the second authentication server, and the protection nonce. The message encryption key may be obtained by means of negotiation between the REQ and the AAC, or may be pre-shared by the REQ and the AAC. In the present application, an object to be encrypted is referred to as to-be-encrypted data.

In S103, the REQ uses a message encryption key to decrypt $EncData_{AAC}$ to obtain a protection nonce, an identity authentication result information ciphertext, and $Sig_{AS\_REQ}$.

$EncData_{AAC}$ is obtained by the AAC by using the message encryption key and the symmetric encryption algorithm to encrypt information including the identity authentication result information ciphertext, the digital signature of the second authentication server, and the protection nonce, so that upon receiving $EncData_{AAC}$ sent by the AAC, the REQ may use the message encryption key to decrypt $EncData_{AAC}$ to obtain the protection nonce, the identity authentication result information ciphertext, and $Sig_{AS\_REQ}$.

In S104, the REQ uses a public key of AS-REQ to verify $Sig_{AS\_REQ}$.

REQ knows the public key of the authentication server trusted thereby, so that the REQ may use the public key of AS-REQ to verify $Sig_{AS\_REQ}$. When verification is not successful, the received AACAuth may be discarded.

In S105, the REQ uses the protection nonce to decrypt the identity authentication result information ciphertext to obtain identity authentication result information.

In S106, the REQ determines an identity authentication result of the AAC according to $Res_{AAC}$ in the identity authentication result information.

$Res_{AAC}$ may indicate whether the AAC is legal, so that the REQ may determine, according to $Res_{AAC}$, whether the AAC is legal, thereby ensuring that the REQ can access a legal network.

It can be seen that confidentiality processing performed on identity authentication result information can prevent private or sensitive information from being exposed, so that even if an attacker intercepts identity authentication result information, the attacker cannot acquire private or sensitive information therein, thereby preventing the attacker from focusing on attacking a legal authentication access controller, and ensuring the security of an authentication access controller, a requester, and even a network. In addition, an authentication server is introduced, so that a requester can perform real-time unilateral identity authentication on an authentication access controller while confidentiality of identity related information of entities is ensured, thereby establishing the foundation for ensuring that a user can access a legal network.

It should be noted that the identity authentication result information of the AAC may be represented by $Pub_{AAC}$, and the protection nonce may be represented by $Nonce_{AACPub}$. The identity authentication result information ciphertext may be generated in the following manner: using a symmetric encryption algorithm and the protection nonce $Nonce_{AACPub}$ to encrypt information including the identity authentication result information $Pub_{AAC}$ of the AAC to obtain the identity authentication result information ciphertext. For example, an exclusive OR (XOR) operation may be performed on $Nonce_{AACPub}$ and information including $Pub_{AAC}$ to obtain an identity authentication result information ciphertext $Pub_{AAC} \oplus Nonce_{AACPub}$.

Before determining the identity authentication result of the AAC, the REQ may further determine whether verification for a digital signature of the AAC is successful. Please refer to FIG. 1. In some embodiments, AACAuth of S102 may further include a digital signature $Sig_{AAC}$ of the AAC. To-be-signed data of $Sig_{AAC}$ includes other fields before $Sig_{AAC}$ in AACAuth. Correspondingly, the identity authentication result information $Pub_{AAC}$ of the AAC may further include $Cert_{AAC}$, so that before determining the identity authentication result of the AAC according to $Res_{AAC}$ in the identity authentication result information, the REQ further needs to determine whether verification for $Sig_{AAC}$ is successful, and only after the verification is successful, the REQ can determine the identity authentication result of the AAC. A manner in which the REQ determines whether verification for $Sig_{AAC}$ is successful is as follows: the REQ uses $Cert_{AAC}$ in the identity authentication result information obtained by decrypting the identity authentication result information ciphertext to verify $Sig_{AAC}$, and determines, according to a verification result, whether verification for $Sig_{AAC}$ is successful. In the present application, an object to be signed is referred to as to-be-signed data.

In some other embodiment, AACVeri sent by the AAC to AS-AAC may further include the digital signature $Sig_{AAC}$ of the AAC. To-be-signed data of $Sig_{AAC}$ includes other fields before $Sig_{AAC}$ in $AAC_{Veri}$. Therefore, before determining the identity authentication result of the AAC according to $Res_{AAC}$ in the identity authentication result information, the REQ further needs to determine whether verification for $Sig_{AAC}$ is successful, and only after the verification is successful, the REQ can determine the identity authentication result of the AAC. The REQ determines, in the following manner, whether verification for $Sig_{AAC}$ is successful: AS-AAC trusted by the AAC uses $Cert_{AAC}$ obtained by decrypting the identity information ciphertext $EncPub_{AS}$ in AACVeri to verify $Sig_{AAC}$, and only after verification is successful, a subsequent process is performed. Therefore, if the REQ can receive AACAuth of S102, the REQ determines that the verification for $Sig_{AAC}$ is successful.

Please refer to FIG. 1, messages transmitted between the REQ, the AAC, and the authentication server may further include parameter information such as nonces generated by the AAC and/or the REQ, identifiers, etc. Normally, during identity authentication, these nonces and/or identifiers should remain unchanged when being transmitted via various messages. However, if cases such as a network jitter or attack, or the like occur, the parameter information such as the nonce and/or the identifier or the like in the message may be lost or tampered with. Thus, consistency verification may further be performed on the identifier and/or the nonce in the message during identity authentication, so as to ensure the reliability and freshness of the authentication result. The consistency verification includes the followings.

In some embodiments, if the AAC acquires a second nonce $Nonce_{REQ}$ sent by the REQ and/or the identifier $ID_{REQ}$ of the REQ, AACVeri sent by the AAC to AS-AAC may further include $Nonce_{REQ}$ and/or $ID_{REQ}$, then in the case of non-roaming. ASVeri of S101 may further include $Nonce_{REQ}$ and/or $ID_{REQ}$, and in the case of roaming, AS-AACVeri sent by AS-AAC to AS-REQ may further include $Nonce_{REQ}$ and/or $ID_{REQ}$, and AS-REQVeri sent by AS-REQ to AS-AAC may further include $Nonce_{REQ}$ and/or $ID_{REQ}$. ASVeri of S101 may further include $Nonce_{REQ}$ and/or $ID_{REQ}$. The to-be-encrypted data of $EncData_{AAC}$ in AAC-Auth of S102 further includes $Nonce_{REQ}$ and/or $ID_{REQ}$. Correspondingly, in S103, the REQ decrypts $EncData_{AAC}$ to further obtain Nonce-REQ and/or $ID_{REQ}$. Therefore, before performing S106, the REQ further needs to perform comparison to determine whether $Nonce_{REQ}$ and/or $ID_{REQ}$ obtained by decrypting $EncData_{AAC}$ is consistent with $Nonce_{REQ}$ generated by the REQ and/or the identifier $ID_{REQ}$ of the REQ itself, and if they are consistent, the REQ further performs S106, or if not, the REQ discards AACAuth.

In some other embodiments. AACAuth of S102 may further include a message integrity check code $MacTag_{AAC}$. $MacTag_{AAC}$ is generated by the AAC by using a message integrity check key to perform integrity check calculation on fields, other than $MacTag_{AAC}$, in AACAuth. Correspondingly, before performing S106, the REQ further needs to check $MacTag_{AAC}$, and if the check of $MacTag_{AAC}$ is successful, the REQ further performs S106. During the check of $MacTag_{AAC}$, the REQ should use the message integrity check key to perform calculation on fields, other than $MacTag_{AAC}$, in AACAuth to generate $MacTag_{AAC}$, and compare calculated $MacTag_{AAC}$ with $MacTag_{AAC}$, in received AACAuth. If the calculated $MacTag_{AAC}$ is consistent with the $MacTag_{AAC}$ in received AACAuth, the check is successful; otherwise, the check is not successful. A manner of generating the message integrity check key used by the REQ and the AAC will be described in a next embodiment.

Figure 2:
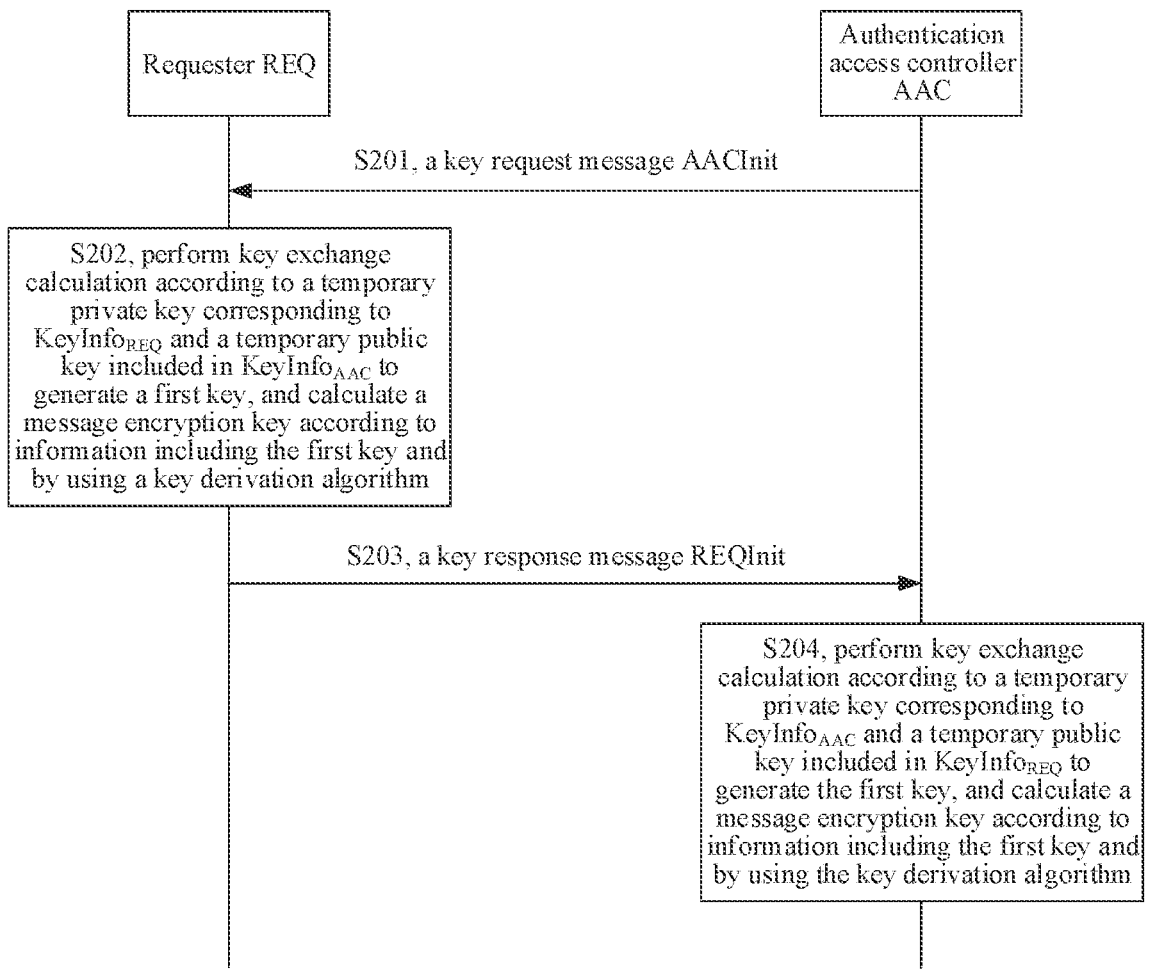
FIG. 2 is a schematic diagram of a method for negotiating a message encryption key by a requester REQ and an authentication access controller AAC according to an embodiment of the present application.

In the above embodiments, the message encryption key used by the AAC and the REQ may be obtained by means of negotiation between the REQ and the AAC. Therefore, further provided in the present embodiment is a method for negotiating a message encryption key by a REQ and an AAC. Referring to FIG. 2, the method includes the following operations.

In S201, an AAC sends a key request message AACInit to a REQ.

The AACInit includes a key exchange parameter $KeyInfo_{AAC}$ of the AAC. $KeyInfo_{AAC}$ includes a temporary public key of the AAC. Key exchange refers to a key exchange algorithm such as Diffie-Hellman (DR), etc. The AACInit may further include a first nonce $Nonce_{AAC}$ generated by the AAC.

In addition, the AACInit may further include Security capabilities AA c. Security capabilities $_{AAC}$ represents security capability parameter information supported by the AAC, and includes an identity authentication suite (the identity authentication suite includes one or more identity authentication methods), one or more symmetric encryption algorithms, one or more integrity check algorithms, and/or one or more key derivation algorithms etc., supported by the AAC, so that the REQ selects and uses a particular security policy. Therefore, the REQ may select, according to Security capabilities $_{AAC}$, the particular security policy security capabilities $_{REQ}$ to be used by the REQ. Security capabilities $_{REQ}$ represents an identity authentication method, a symmetric encryption algorithm, an integrity check algorithm, and/or a key derivation algorithm etc., correspondingly determined and used by the REQ.

In S202, the REQ performs key exchange calculation according to a temporary private key corresponding to a key exchange parameter $KeyInfo_{REQ}$ of the REQ and a temporary public key included in $KeyInfo_{AAC}$ to generate a first key, and calculates, according to information including the first key, a message encryption key by using a key derivation algorithm.

If AACInit of S201 further includes $Nonce_{AAC}$ generated by the AAC, the REQ may perform key exchange calculation according to a temporary private key corresponding to $KeyInfo_{REQ}$ and a temporary public key included in $KeyInfo_{AAC}$ to generate a first key K1, and calculate a message encryption key according to K1 in combination with information including $Nonce_{AAC}$ and a second nonce $Nonce_{REQ}$ generated by the REQ and by using a negotiated or preset key derivation algorithm. The negotiated key derivation algorithm may be selected to use by the REQ according to Security capabilities $_{AAC}$ sent by the AAC. $KeyInfo_{REQ}$ is the key exchange parameter generated by the REQ, and includes the temporary public key of the REQ. The temporary private key corresponding to $KeyInfo_{REQ}$ is generated by the REQ, and corresponds to the temporary public key of the REQ. That is, the temporary public key and the temporary private key are a temporary public-private key pair.

In S203, the REQ sends a key response message REQInit to the AAC.

The REQInit includes $KeyInfo_{REQ}$, so that the AAC performs calculation according to information including the temporary private key corresponding to $KeyInfo_{AAC}$ and the temporary public key included in $KeyInfo_{REQ}$ to obtain the message encryption key. The temporary private key corresponding to $KeyInfo_{AAC}$ is generated by the AAC, and corresponds to the temporary public key of the AAC. That is, the temporary public key and the temporary private key are a temporary public-private key pair.

The REQInit may further include Security capabilities $_{REQ}$. The REQInit may further include $Nonce_{REQ}$, so that the AAC performs calculation according to information including the temporary private key corresponding to $KeyInfo_{AAC}$ the temporary public key included in $KeyInfo_{REQ}$, the $Nonce_{AAC}$, and the $Nonce_{AAC}$ to obtain the message encryption key.

The REQInit may further include $Nonce_{AAC}$, and before calculating the message encryption key, the AAC may verify consistency between $Nonce_{AAC}$ in REQInit and $Nonce_{AAC}$ generated by the AAC, so as to ensure that REQInit received by the AAC is a response message for AACInit.

In S204, the AAC performs key exchange calculation according to a temporary private key corresponding to $KeyInfo_{AAC}$ and a temporary public key included in $KeyInfo_{REQ}$ to generate the first key, and calculates, according to information including the first key, a message encryption key by using the key derivation algorithm.

If the REQInit further includes $Nonce_{REQ}$, the AAC may perform key exchange calculation according to the temporary private key corresponding to the $KeyInfo_{AAC}$ and the temporary public key included in the $KeyInfo_{REQ}$ to generate the first key K1, and calculate the message encryption key according to K1 in combination with information including $Nonce_{AAC}$ and $Nonce_{REQ}$ and by using a negotiated or preset key derivation algorithm. The negotiated key derivation algorithm may be selected to use by the AAC according to Security capabilities $_{REQ}$ sent by the REQ.

It should be noted that in the embodiment in FIG. 2, the REQ and the AAC may also generate a message integrity check key. An implementation manner in which the REQ and the AAC each generates a message integrity check key is the same as the implementation manner illustrated in the embodiment in FIG. 2 in which the REQ and the AAC each generates a message encryption key. For example, the AAC may use the key derivation algorithm to derive a string of key data as in the embodiment in FIG. 2. The string of key data may be used as the message encryption key, and may also be used as the message integrity check key. Alternatively, part of key data in the string of key data is used as the message encryption key, and another part thereof is used as the message integrity check key. The AAC may also use the key derivation algorithm to derive two identical or different strings of key data separately as in the embodiment in FIG. 2, where one string of key data is used as the message encryption key, and the other string of key data is used as the message integrity check key. The REQ may use the key derivation algorithm to derive a string of key data as in the embodiment in FIG. 2. The string of key data may not only be used as the message encryption key, but also may be used as the message integrity check key. Alternatively, part of key data in the string of key data is used as the message encryption key, and another part thereof is used as the message integrity check key. The REQ may also use the key derivation algorithm to derive two identical or different strings of key data separately as in the embodiment in FIG. 2, where one string of key data is used as the message encryption key, and the other string of key data is used as the message integrity check key.

Further provided in an embodiment of the present application is a method of using information exchange between an AAC and a REQ to determine a first authentication server and/or a second authentication server used in a current authentication process.

Please refer to FIG. 2. The AAC adds the identifier $ID_{AS\_AAC}$ of at least one authentication server trusted by the AAC to AACInit of S201, and the REQ determines an identifier $ID_{AS\_REQ}$ of at least one authentication server trusted thereby according to $ID_{AS\_AAC}$ in AACInit. During implementation, the REQ selects the identifier of at least one authentication server trusted thereby from $ID_{AS\_AAC}$ as $ID_{AS\_REQ}$, and if selection is not successful, the REQ uses an identifier of at least one authentication server trusted thereby as $IDs_{AS\_REQ}$ (where successful selection corresponds to the case of non-roaming, and unsuccessful selection corresponds to the case of roaming), and adds $ID_{AS\_REQ}$ to REQInit of step S203 to send the same to the AAC. In turn, the AAC is able to determine the first authentication server according to $ID_{AS\_AAC}$ and $ID_{AS\_REQ}$. For example, the AAC may determine whether an identifier of at least one identical authentication server is present in $ID_{AS\_REQ}$ and $ID_{AS\_AAC}$ and if so, i.e., in the case of non-roaming, the AAC determines, from the identifier of the at least one authentication server trusted by both the REQ and the AAC, the first authentication server participating in identity authentication, or if not, i.e., in the case of roaming, the AAC needs to determine, according to $ID_{AS\_AAC}$, the first authentication server AS-AAC participating in identity authentication, and send $ID_{AS\_REQ}$ to AS-AAC, so that AS-AAC determines the second authentication server AS-REQ according to $ID_{AS\_REQ}$.

In another implementation manner, the AAC may not have to send $ID_{AS\_AAC}$ to the REQ, and the REQ adds the identifier $ID_{AS\_REQ}$ of at least one authentication server trusted thereby to REQInit of step S203. A specific implementation manner in which the first authentication server and/or the second authentication server participating in the identity authentication process is determined according to $ID_{AS\_REQ}$ and the identifier $ID_{AS\_AAC}$ of the authentication server trusted by the AAC is the same as the preceding implementation manner.

An authentication server trusted by the REQ and an authentication server trusted by the AAC may be the same or different. The authentication server trusted by the REQ and the authentication server trusted by the AAC being the same is the case of non-roaming, and the authentication server trusted by the REQ and the authentication server trusted by the AAC being different is the case of roaming.

Figure 3:
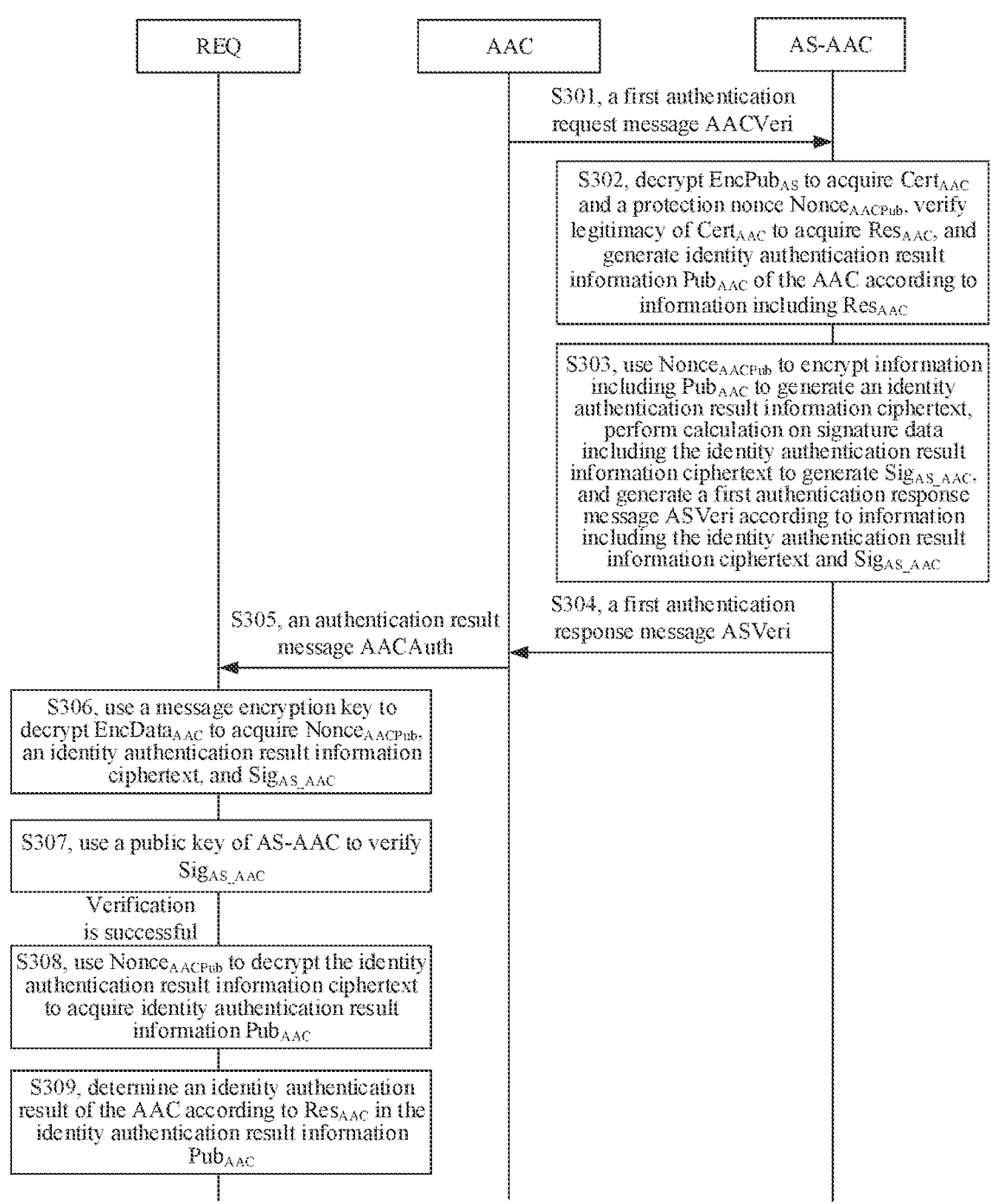
FIG. 3 is a schematic diagram of a method of identity authentication in the case of non-roaming according to an embodiment of the present application.

Referring to FIG. 3, FIG. 3 is an embodiment of a method of identity authentication in the case of non-roaming, hi this case, an authentication server trusted by both a REQ and an AAC may be represented by AS-AAC (or AS-REQ). Before the embodiment is performed, the REQ and the AAC both have a message encryption key. The message encryption key is pre-shared between the REQ and the AAC or negotiated by using the method shown in FIG. 2. On the basis of the embodiment of FIG. 1, before S101, the method of identity authentication of the embodiment of FIG. 3 further includes the following operations.

In S301, the AAC sends a first authentication request message AACVeri to AS-AAC.

The AACVeri includes an identity information ciphertext $EncPub_{AS}$. $EncPub_{AS}$ is obtained by the AAC by using a public key of an encryption certificate to encrypt information including $Cert_{AAC}$ and a protection nonce $Nonce_{AACPub}$.

In S302, AS-AAC uses a private key corresponding to the encryption certificate to decrypt $EncPub_{AS}$ to obtain $Cert_{AAC}$ and $Nonce_{AACPub}$, verifies legality of $Cert_{AAC}$ to obtain $Res_{AAC}$, and generates identity authentication result information $Pub_{AAC}$ of the AAC according to information including $Res_{AAC}$.

In S303, the AS-AAC uses $Nonce_{AACPub}$ to encrypt information including $Pub_{AAC}$ generate an identity authentication result information ciphertext, performs calculation on to-be-signed data including the identity authentication result information ciphertext to generate a digital signature $Sig_{AS\_AAC}$ of AS-AAC, and generates a first authentication response message ASVeri according to information including the identity authentication result information ciphertext and $Sig_{AS\_AAC}$.

It should be noted that S304 to S309 in FIG. 3 sequentially correspond to S101 to S106 in FIG. 1, and AS-AAC and $Sig_{AS\_AAC}$ in S304 to S309 correspond to AS-REQ and $Sig_{AS\_REQ}$ in S101 to S106.

Figure 4:
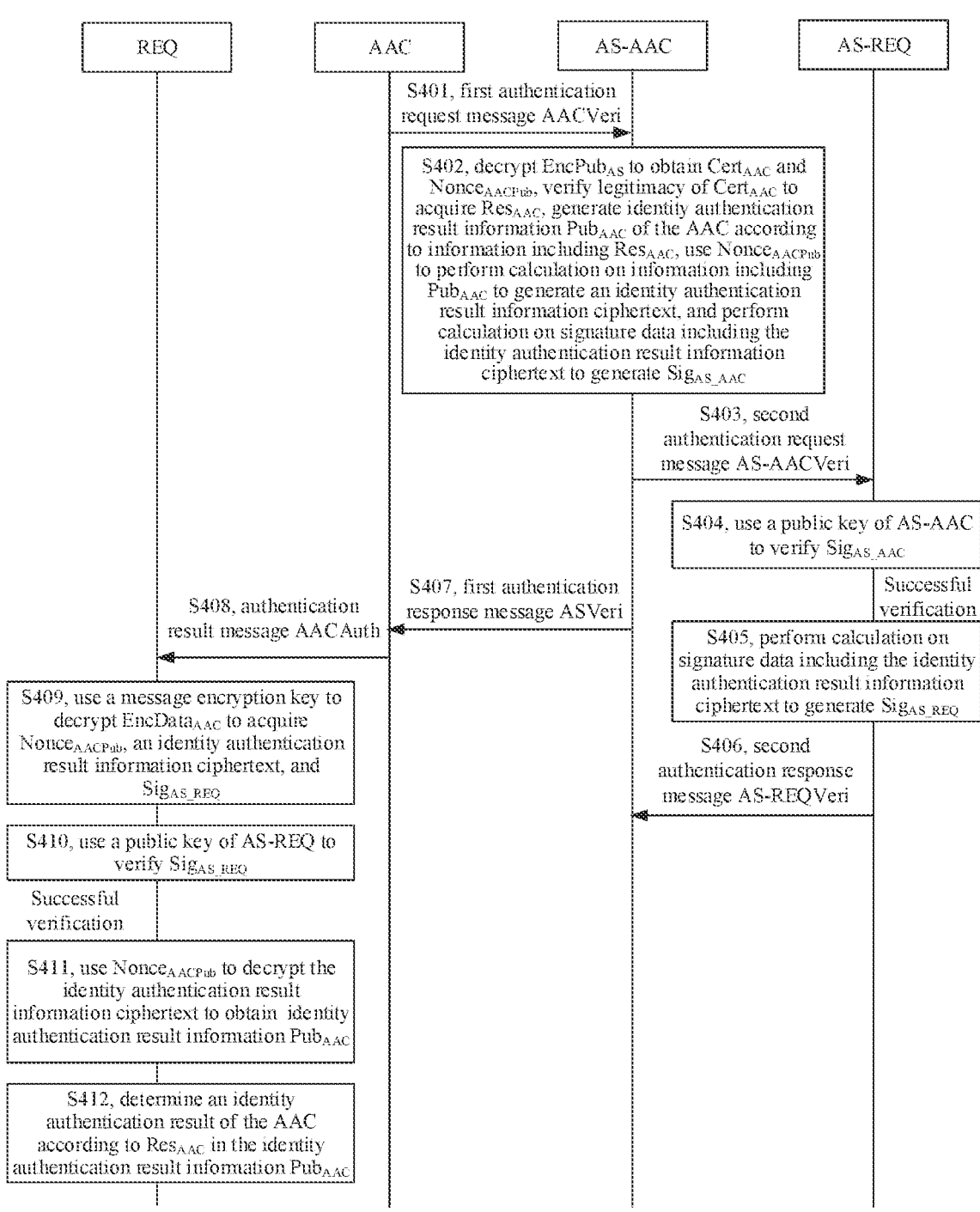
FIG. 4 is a schematic diagram of a method of identity authentication in the case of roaming according to an embodiment of the present application.

Referring to FIG. 4, FIG. 4 is an embodiment of a method of identity authentication in the case of roaming. Before the embodiment is performed, a REQ and an AAC both have a message encryption key. The message encryption key is pre-shared between the REQ and the AAC or negotiated by using the method shown in FIG. 2. On the basis of the embodiment of FIG. 1, before S101, the method of identity authentication of the embodiment of FIG. 4 further includes the following operations.

In S401, the AAC sends a first authentication request message AACVeri to AS-AAC.

The AACVeri includes an identity information ciphertext $EncPub_{AS}$. $EncPub_{AS}$ is obtained by the AAC by using a public key of an encryption certificate to encrypt information including $Cert_{AAC}$ and a protection nonce $Nonce_{AACPub}$.

In S402, AS-AAC uses a private key corresponding to the encryption certificate to decrypt $EncPub_{AS}$ to obtain $Cert_{AAC}$ and $Nonce_{AACPub}$, verifies legality of $Cert_{AAC}$ to obtain $Res_{AAC}$, generates identity authentication result information $Pub_{AAC}$ of the AAC according to information including $Res_{AAC}$, uses $Nonce_{AACPub}$ to encrypt information including $Pub_{AAC}$ to generate an identity authentication result information ciphertext, and performs calculation on to-be-signed data including the identity authentication result information ciphertext generate a digital signature $Sig_{AS\_AAC}$ of AS-AAC.

In S403, AS-AAC sends a second authentication request message AS-AACVeri to AS-REQ.

The AS-AACVeri includes the identity authentication result information ciphertext and $Sig_{AS\_AAC}$.

In S404, AS-REQ uses a public key of AS-AAC to verify $Sig_{AS\_AAC}$.

If verification is successful, S405 is performed.

In S405, AS-REQ performs calculation on to-be-signed data including the identity authentication result information ciphertext to generate a digital signature $Sig_{AS\_REQ}$ of AS-REQ.

In S406, AS-REQ sends a second authentication response message AS-REQVeri to AS-AAC.

The AS-REQVeri includes the identity authentication result information ciphertext and $Sig_{AS\_REQ}$.

In S407. AS-AAC sends a first authentication response message ASVeri to the AAC.

The ASVeri includes the identity authentication result information ciphertext and $Sig_{AS\_REQ}$ in AS-REQVeri.

It should be noted that S407 to S412 in FIG. 4 correspond to S101 to S106 in FIG. 1.

Figure 5:
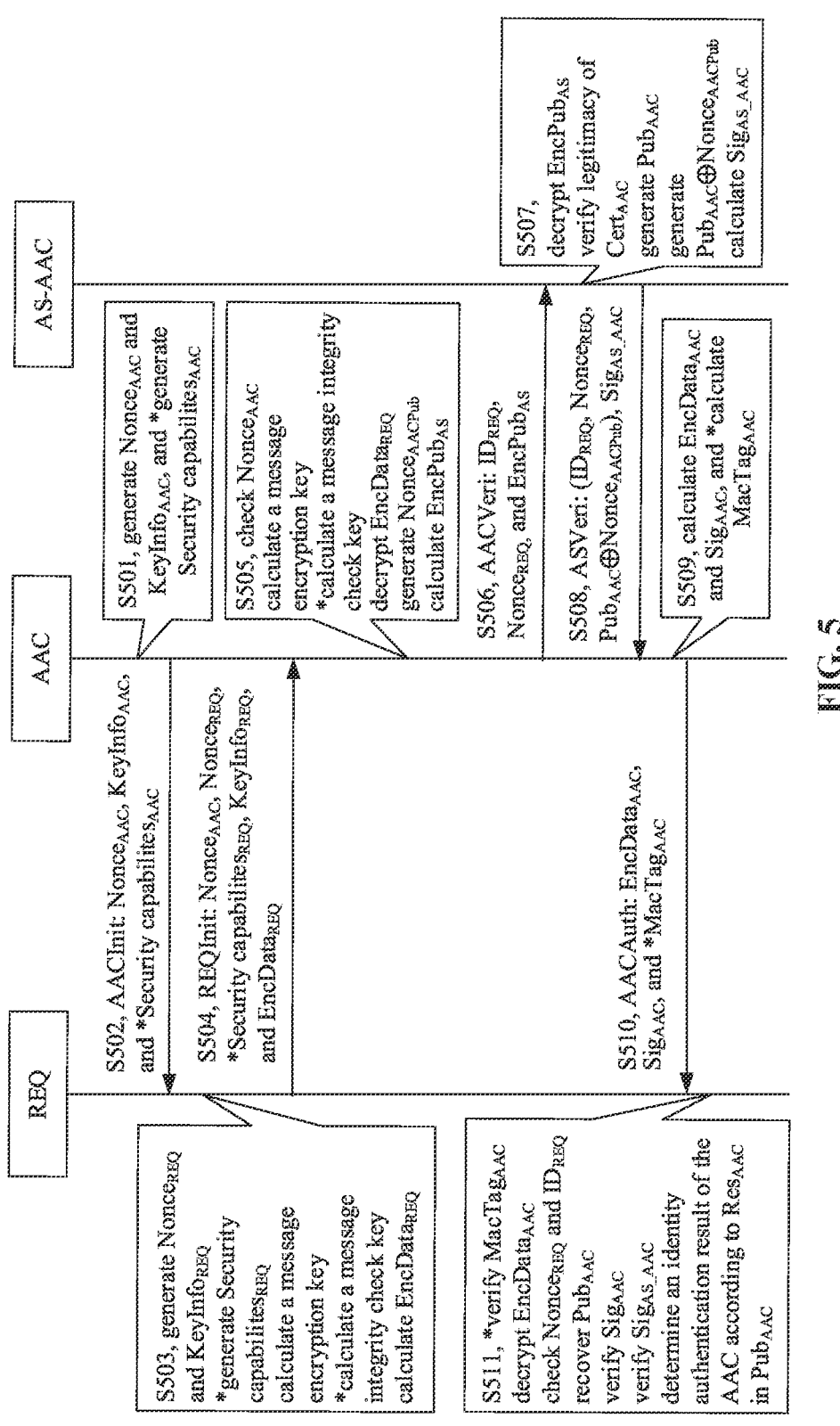
FIG. 5 is a schematic diagram of a method of identity authentication in the case of non-roaming according to an embodiment of the present application, where "*" represents an optional field or an optional operation.

Referring to FIG. 5, FIG. 5 is an embodiment of a method of identify authentication in the case of non-roaming. In this case, an authentication server trusted by both a REQ and an AAC may be represented by AS-AAC (or AS-REQ). In the embodiment, a message encryption key negotiation process between a REQ and an AAC is fused into an identity authentication process, thereby facilitating project implementation. A digital signature $Sig_{AAC}$ of an AAC is verified by a REQ. The method includes the following operations.

In S501, an AAC generates $Nonce_{AAC}$ and $KeyInfo_{AAC}$, and generates Security capabilities$_{AAC}$ as desired.

In S502, the AAC sends a key request message AACInit to a REQ.

The AACInit includes $Nonce_{AAC}$, $KeyInfo_{AAC}$, and Security capabilities$_{AAC}$. Security capabilities$_{AAC}$ is an optional field, represents security capability parameter information supported by the AAC, and includes an identity authentication suite, one or more symmetric encryption algorithms, one or more integrity check algorithms, and/or one or more key derivation algorithms etc., supported by the AAC (applicable herein).

In S503, the REQ generates $Nonce_{REQ}$ and $KeyInfo_{REQ}$, generates Security capabilities$_{REQ}$ as desired, performs key exchange calculation according to a temporary private key corresponding to $KeyInfo_{REQ}$ and a temporary public key included in $KeyInfo_{AAC}$ to generate a first key K1, calculates a message encryption key and a message integrity check key according to K1 in combination with $Nonce_{AAC}$, $Nonce_{REQ}$, and other information (other information used by the REQ and the AAC is the same, and is optional, such as a particular string, etc.) and by using a negotiated or preset key derivation algorithm, and uses the message encryption key and a symmetric encryption algorithm to calculate an identifier ciphertext $EncData_{REQ}$ of the REQ.

Security capabilities$_{REQ}$ is an optional field, and represents selection of a particular security policy performed by the REQ according to Security capabilities$_{AAC}$, i.e., an identity authentication method, a symmetric encryption algorithm, an integrity check algorithm, and/or a key derivation algorithm, etc., determined and used by the REQ (applicable herein). Whether the REQ generates Security capabilities$_{REQ}$ depends on whether AACInit sent by the AAC to the REQ carries Security capabilities$_{AAC}$. The generating, by the REQ, the message integrity check key is an optional operation, and this step may be performed subsequently as required.

In S504, the REQ sends a key response message REQInit to the AAC.

The REQInit includes $Nonce_{AAC}$, $Nonce_{REQ}$, Security capabilities$_{REQ}$, $KeyInfo_{REQ}$, and $EncData_{REQ}$. Security capabilities$_{REQ}$ is an optional field. $Nonce_{AAC}$ should be equal to a corresponding field in AACInit. To-be-encrypted data of $EncData_{REQ}$ includes $ID_{REQ}$.

In S505, the AAC performs, upon receiving REQInit, the following operations (if not specified otherwise or if not due to a logical relationship, actions numbered (1), (2), herein do not necessarily have a sequential order according to the numbers, applicable herein), including:

(1) checking whether $Nonce_{AAC}$ in REQInit is the same as $Nonce_{AAC}$ generated by the AAC, and if they are different, discarding REQInit;

(2) performing key exchange calculation according to the temporary private key corresponding to $KeyInfo_{AAC}$ and the temporary public key included in $KeyInfo_{REQ}$ to generate a first key K1, and calculating a message encryption key and a message integrity check key according to K1 in combination with $Nonce_{AAC}$, $Nonce_{REQ}$, and other information (other information used by the AAC and the REQ is the same, and is optional, such as a particular string, etc.) and by using a negotiated or preset key derivation algorithm, wherein the generating, by the AAC, the message integrity check key is an optional operation, and this step may be performed subsequently as required;

(3) using the message encryption key and the symmetric encryption algorithm to decrypt $EncData_{REQ}$ to obtain $ID_{REQ}$;

(4) generating a protection nonce $Nonce_{AACPub}$; and (5) using a public key of an encryption certificate to calculate an identity information ciphertext $EncPub_{AS}$.

In S506, the AAC sends a first authentication request message AACVeri to AS-AAC.

The AACVeri includes $ID_{REQ}$, $Nonce_{REQ}$, and $EncPub_{AS}$. $ID_{REQ}$ and $Nonce_{REQ}$ should be respectively equal to corresponding fields in REQInit. To-be-encrypted data of $EncPub_{AS}$ includes $Cert_{AAC}$ and $Nonce_{AACPub}$.

In S507. AS-AAC performs, upon receiving AACVeri, the following operations:

(1) using a private key corresponding to the encryption certificate to decrypt $EncPub_{AS}$ to obtain $Cert_{AAC}$ and $Nonce_{AACPub}$;

(2) verifying legality of $Cert_{AAC}$ to obtain $Res_{AAC}$, and generating identity authentication result information $Pub_{AAC}$ according to information including $Cert_{AAC}$ and $Res_{AAC}$;

(3) performing an XOR operation on $Pub_{AAC}$ and $Nonce_{AACPub}$ to generate an identity authentication result information ciphertext $Pub_{AAC} \oplus Nonce_{AACPub}$; and (4) calculating a digital signature $Sig_{AS\_AAC}$ of AS-AAC.

In S508, AS-AAC sends a first authentication response message ASVeri to the AAC.

The ASVeri includes $ID_{REQ}$, $Nonce_{REQ}$, $Pub_{AAC} \oplus Nonce_{AACPub}$, and $Sig_{AS\_AAC}$. $ID_{REQ}$, $Nonce_{REQ}$. $Nonce_{AACPub}$ should be respectively equal to corresponding fields in AACVeri. To-be-signed data of $Sig_{AS\_AAC}$ includes other fields before $Sig_{AS\_AAC}$ in ASVeri. For example, when ASVeri sequentially includes $ID_{REQ}$, $Nonce_{REQ}$, $Pub_{AAC}{}^{\oplus}Nonce_{AACPub}$, and $Sig_{AS\_AAC}$, the to-be-signed data of $Sig_{AS\_AAC}$ includes $ID_{REQ}$, $Nonce_{REQ}$, and $Pub_{AAC}{}^{\oplus}Nonce_{AACPub}$.

In S509, the AAC performs, upon receiving ASVeri, the following operations:

(1) using the message encryption key and the symmetric encryption algorithm to calculate authentication result information $EncData_{AAC}$;

(2) calculating a digital signature $Sig_{AAC}$ of the AAC; and (3) calculating $MacTag_{AAC}$ as desired.

In S510, the AAC sends an authentication result message AACAuth to the REQ.

The AACAuth includes $EncData_{AAC}$, $Sig_{AAC}$, and $MacTag_{AAC}$. To-be-encrypted data of $EncData_{AAC}$ includes $ID_{REQ}$, $Nonce_{REQ}$, $Pub_{AAC}{}^{\oplus}Nonce_{AACPub}$, $Sig_{AS\_AAC}$, and $Nonce_{AACPub}$ $ID_{REQ}$, $Nonce_{REQ}$, $Pub_{AAC}{}^{\oplus}Nonce_{AACPub}$, and $Sig_{AS\_AAC}$ should be respectively equal to corresponding fields in ASVeri. To-be-signed data of $Sig_{AAC}$ includes other fields before the $Sig_{AAC}$ field in AACAuth. $MacTag_{AAC}$ is an optional field, and a calculation process thereof includes: using the message integrity check key and the integrity check algorithm to perform calculation on information including fields, other than $MacTag_{AAC}$, in AACAuth to generate $MacTag_{AAC}$.

In S511, the REQ performs, upon receiving the AAC-Auth, the following operations:

(1) if $MacTag_{AAC}$ is present in AACAuth, verifying $MacTag_{AAC}$, a verification process of $MacTag_{AAC}$ including: using the message integrity check key and the integrity check algorithm to perform calculation locally on information including fields, other than $MacTag_{AAC}$, in AACAuth to generate $MacTag_{AAC}$ (the calculation manner is the same as a manner in which the AAC calculates $MacTag_{AAC}$), and comparing calculated $MacTag_{AAC}$ with $MacTag_{AAC}$ in received AAC-Auth;

(2) using the message encryption key and the symmetric encryption algorithm to decrypt $EncData_{AAC}$ to obtain $ID_{REQ}$, $Nonce_{REQ}$, $Pub_{AAC}{}^{\oplus}Nonce_{AACPub}$, $Sig_{AS\_AAC}$, and $Nonce_{AACPub}$;

(3) checking whether $Nonce_{REQ}$ and $ID_{REQ}$ are respectively the same as $Nonce_{REQ}$ generated by the REQ and the identifier $ID_{REQ}$ of the REQ itself;

(4) performing an XOR operation on $Nonce_{AACPub}$ and $Pub_{AAC}{}^{\oplus}Nonce_{AACPub}$, to recover $Pub_{AAC}$;

(5) using $Cert_{AAC}$ in $Pub_{AAC}$ to verify $Sig_{AAC}$;

(6) using a public key of AS-AAC to verify $Sig_{AS\_AAC}$; and (7) after the above checking and verifications are successful, determining an identity authentication result of the AAC according to $Res_{AAC}$ in $Pub_{AAC}$, or if any step in the above checking and verifications is not successful, discarding AACAuth immediately.

Figure 6:
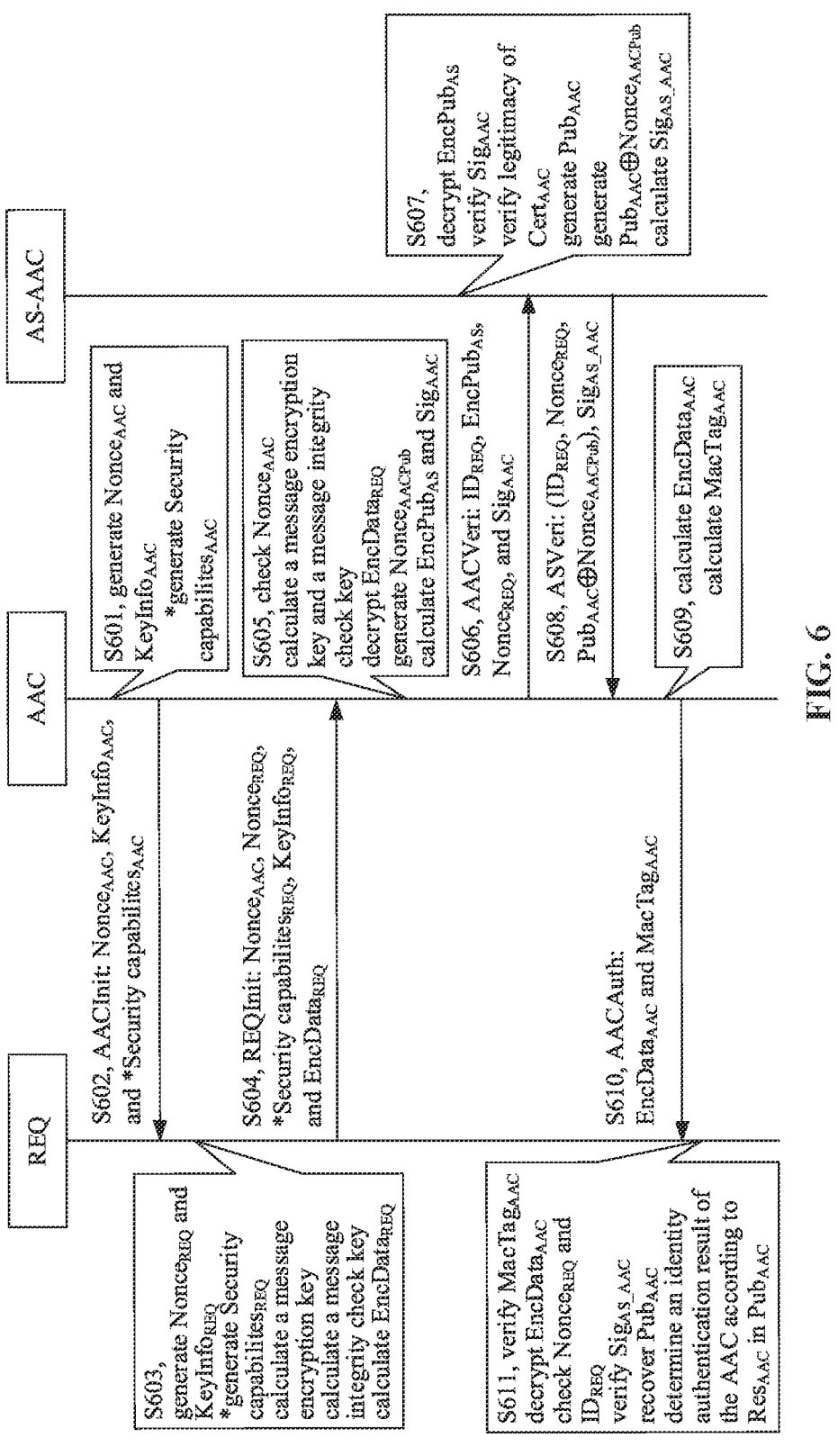
FIG. 6 is a schematic diagram of another method of identity authentication in the case of non-roaming according to an embodiment of the present application, where "*" represents an optional field or an optional operation.

Referring to FIG. 6, FIG. 6 is another embodiment of a method of identity authentication in the case of non-roaming. In this case, an authentication server trusted by both a REQ and an AAC may be represented by AS-AAC (or AS-REQ), in the embodiment, a message encryption key negotiation process between a REQ and an AAC is fused into an identity authentication process, thereby facilitating project implementation. A digital signature $Sig_{AAC}$ of an AAC is verified by AS-AAC. The method includes the following operations.

In S601, an AAC generates $Nonce_{AAC}$ and $KeyInfo_{AAC}$, and generates Security capabilities$_{AAC}$ as desired.

In S602, the AAC sends a key request message AACInit to a REQ.

The AACInit includes $Nonce_{AAC}$, $KeyInfo_{AAC}$, and Security capabilities$_{AAC}$. Security capabilities$_{AAC}$ is an optional field.

In S603, the REQ generates $Nonce_{REQ}$ and $KeyInfo_{REQ}$, generates Security capabilities$_{REQ}$ as desired, performs key exchange calculation according to a temporary private key corresponding to $KeyInfo_{REQ}$ and a temporary public key included in $KeyInfo_{AAC}$ to generate a first key K1 calculates a message encryption key and a message integrity check key according to K1 in combination with $Nonce_{AAC}$, $Nonce_{REQ}$, and other information (other information used by the REQ and the AAC is the same, and is optional, such as a particular string, etc.) and by using a negotiated or preset key derivation algorithm, and uses the message encryption key and a symmetric encryption algorithm to calculate an identifier ciphertext $EncData_{REQ}$ of the REQ.

In S604, the REQ sends a key response message REQInit to the AAC.

The REQInit includes $Nonce_{AAC}$, $Nonce_{REQ}$, Security capabilities$_{REQ}$, $KeyInfo_{REQ}$, and $EncData_{REQ}$. To-be-encrypted data of $EncData_{REQ}$ includes $ID_{REQ}$. $Nonce_{AAC}$ should be equal to a corresponding field in AACInit. Security capabilities$_{REQ}$ is an optional field.

In S605, the AAC performs, upon receiving REQInit, the following operations:

(1) checking whether $Nonce_{AAC}$ in REQInit is the same as $Nonce_{AAC}$ generated by the AAC, and if they are different, discarding REQInit;

(2) performing key exchange calculation according to the temporary private key corresponding to $KeyInfo_{AAC}$ and the temporary public key included in $KeyInfo_{REQ}$ to generate a first key K1, and calculating a message encryption key and a message integrity check key according to K1 in combination with $Nonce_{AAC}$, $Nonce_{REQ}$, and other information (other information used by the AAC and the REQ is the same, and is optional, such as a particular string, etc.) and by using a negotiated or preset key derivation algorithm;

(3) using the message encryption key and the symmetric encryption algorithm to decrypt $EncData_{REQ}$ to obtain $ID_{REQ}$;

(4) generating a protection nonce $Nonce_{AACPub}$;

(5) using a public key of an encryption certificate to calculate an identity information ciphertext $EncPub_{AS}$; and (6) calculating a digital signature $Sig_{AAC}$, of the AAC.

In S606, the AAC sends a first authentication request message AACVeri to AS-AAC.

The AACVeri includes $ID_{REQ}$, $EncPub_{AS}$ $Nonce_{REQ}$, and $Sig_{AAC}$. $ID_{REQ}$ and $Nonce_{REQ}$ should be respectively equal to corresponding fields in REQInit. To-be-encrypted data of $EncPub_{AS}$ includes $Cert_{AAC}$ and $Nonce_{AACPub}$. To-be-signed data of $Sig_{AAC}$ includes other fields before $Sig_{AAC}$ in AACVeri.

In S607, AS-AAC performs, upon receiving AACVeri the following operations:

(1) using a private key corresponding to the encryption certificate to decrypt $EncPub_{AS}$ to acquire $Cert_{AAC}$ and $Nonce_{AACPub}$;

(2) using $Cert_{AAC}$ to verify $Sig_{AAC}$, and if verification is not successful, discarding AACVeri;

(3) verifying legality of $\text{Cert}_{AAC}$ to obtain Res A m, and generating $\text{Pub}_{AAC}$ according to information including $\text{Res}_{AAC}$;

(4) performing an XOR operation on $\text{Pub}_{AAC}$ and $\text{Nonce}_{AACPub}$ to generate $\text{Pub}_{AAC}\oplus\text{Nonce}_{AACPub}$; and (5) calculating a digital signature $\text{Sig}_{AS\_AAC}$ of AS-AAC.

In S608, AS-AAC sends a first authentication response message ASVeri to the AAC.

The ASVeri includes $\text{ID}_{REQ}$, $\text{Nonce}_{REQ}$, $\text{Pub}_{AAC}\oplus\text{Nonce}_{AACPub}$, and $\text{Sig}_{AS\_AAC}$. $\text{Nonce}_{REQ}$, and $\text{Nonce}_{AACPub}$ should be respectively equal to corresponding fields in AACVeri. To-be-signed data of $\text{Sig}_{AS\_AAC}$ includes $\text{ID}_{REQ}$, $\text{Nonce}_{REQ}$, and $\text{Pub}_{AAC}\oplus\text{Nonce}_{AACPub}$.

In S609, the AAC performs, upon receiving ASVeri, the following operations:

(1) using the message encryption key and the symmetric encryption algorithm to calculate authentication result information $\text{EncData}_{AAC}$; and (2) calculating $\text{MacTag}_{AAC}$.

In S610, the AAC sends an authentication result message AACAuth to the REQ.

The AACAuth includes $\text{EncData}_{AAC}$ and $\text{MacTag}_{AAC}$. To-be-encrypted data of $\text{EncData}_{AAC}$ includes $\text{ID}_{REQ}$, $\text{Nonce}_{REQ}$, $\text{Pub}_{AAC}\oplus\text{Nonce}_{AACPub}$, $\text{Sig}_{AS\_AAC}$, and $\text{Nonce}_{AACPub}$. $\text{ID}_{REQ}$, $\text{Nonce}_{REQ}$, $\text{Pub}_{AAC}\oplus\text{Nonce}_{AACPub}$, and $\text{Sig}_{AS\_AAC}$ should be respectively equal to corresponding fields in ASVeri. A calculation process of $\text{MacTag}_{AAC}$ is as described in the embodiment of FIG. 5.

In S611, the REQ performs, upon receiving the AAC-Auth, the following operations:

(1) verifying $\text{MacTag}_{AAC}$, a verification process being as described in the embodiment of FIG. 5;

(2) using the message encryption key and the symmetric encryption algorithm to decrypt $\text{EncData}_{AAC}$ to obtain $\text{ID}_{REQ}$, $\text{Nonce}_{REQ}$, $\text{Pub}_{AAC}\oplus\text{Nonce}_{AACPub}$, $\text{Sig}^{AS\_AAC}$, and $\text{Nonce}_{AACPub}$;

(3) checking whether $\text{Nonce}_{REQ}$ and $\text{ID}_{REQ}$ are respectively the same as $\text{Nonce}_{REQ}$ generated by the REQ and the identifier $\text{ID}_{REQ}$ of the REQ itself;

(4) using a public key of AS-AAC to verify $\text{Sig}_{AS\_AAC}$; and (5) if the above checking and verifications are successful, performing an XOR operation on $\text{Nonce}_{AACPub}$ and $\text{Pub}_{AAC}\oplus\text{Nonce}_{AACPub}$ to recover $\text{Pub}_{AAC}$, and determining an identity authentication result of the AAC according to $\text{Res}_{AAC}$ in $\text{Pub}_{AAC}$; if any step in the above checking and verifications is not successful, discarding AACAuth immediately.

Figure 7:
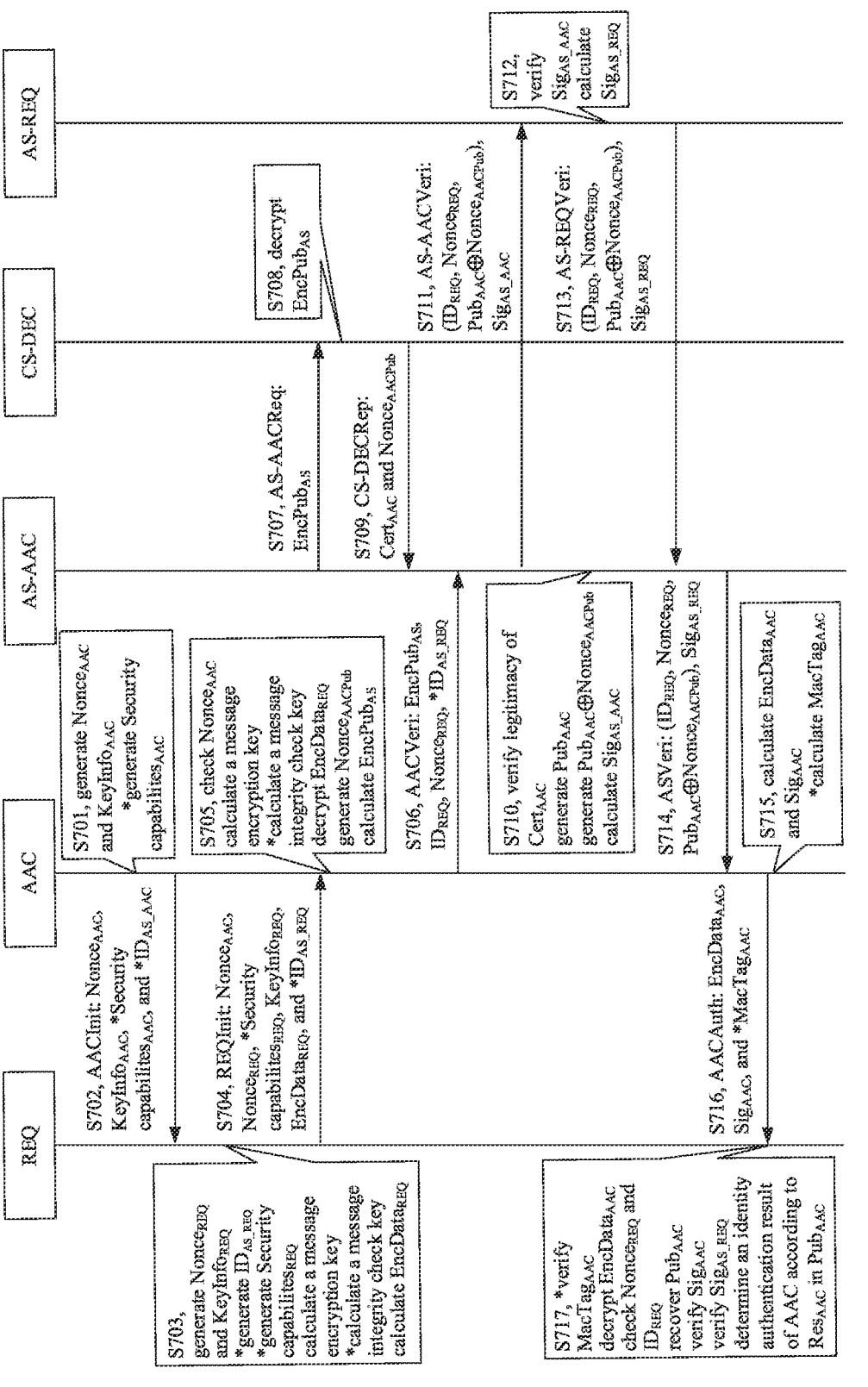
FIG. 7 is a schematic diagram of a method of identity authentication in the case of roaming according to an embodiment of the present application, where "*" represents an optional field or an optional operation.

Referring to FIG. 7, FIG. 7 is an embodiment of a method of identity authentication in the case of roaming. In the embodiment, a message encryption key negotiation process between a REQ and an AAC is fused into an identity authentication process, thereby facilitating project implementation. A digital signature $\text{Sig}_{AAC}$ of an AAC is verified by a REQ. The method includes:

in S701, an AAC generates $\text{Nonce}_{AAC}$ and $\text{KeyInfo}_{AAC}$, and generates Security capabilities$_{AAC}$ as desired.

In S702, the AAC sends a key request message AACInit to a REQ.

The AACInit includes $\text{Nonce}_{AAC}$, $\text{KeyInfo}_{AAC}$, Security capabilities$_{AAC}$, and $\text{ID}_{AS\_AAC}$. Security capabilities$_{AAC}$ and $\text{ID}_{AS\_AAC}$ are optional fields. $\text{ID}_{AS\_AAC}$ represents an identifier of at least one authentication server trusted by the AAC, and is used to allow the REQ to determine, according to $\text{ID}_{AS\_AAC}$, whether a mutually trusted authentication server exists (applicable herein).

In S703, the REQ generates $\text{Nonce}_{REQ}$ and $\text{KeyInfo}_{REQ}$, generates $\text{ID}_{AS\_REQ}$ and Security capabilities$_{REQ}$ as desired, performs key exchange calculation according to a temporary private key corresponding to $\text{KeyInfo}_{REQ}$ and a temporary public key included in $\text{KeyInfo}_{AAC}$ to generate a first key K1, calculates a message encryption key and a message integrity check key according to K1 in combination with $\text{Nonce}_{AAC}$, $\text{Nonce}_{REQ}$, and other information (other information used by the REQ and the AAC is the same, and is optional, such as a particular string, etc.) and by using a negotiated or preset key derivation algorithm, and uses the message encryption key and a symmetric encryption algorithm to calculate an identifier ciphertext $\text{EncData}_{REQ}$ of the REQ.

$\text{ID}_{AS\_REQ}$ and Security capabilities$_{REQ}$ are optional fields. The generating, by the REQ, the message integrity check key is an optional operation, and this step may be performed subsequently as required. $\text{ID}_{AS\_REQ}$ represents an identifier of at least one authentication server trusted by the REQ. When $\text{ID}_{AS\_AAC}$ is present in AACInit, the REQ selects, if possible, from authentication servers trusted thereby, at least one authentication server identifier, which is the same as that in $\text{ID}_{AS\_AAC}$, as $\text{ID}_{AS\_REQ}$, and if selection is not successful, uses an identifier of at least one authentication server trusted thereby as $\text{ID}_{AS\_REQ}$; when $\text{ID}_{AS\_AAC}$ is not present in AACInit, the REQ uses an identifier of at least one authentication server trusted thereby as $\text{ID}_{AS\_REQ}$ (applicable herein).

In S704, the REQ sends a key response message REQInit to the AAC.

The REQInit includes $\text{Nonce}_{AAC}$, $\text{Nonce}_{REQ}$, Security capabilities$_{REQ}$, $\text{KeyInfo}_{REQ}$, $\text{EncData}_{REQ}$, and $\text{ID}_{AS\_REQ}$. To-be-encrypted data of $\text{EncData}_{REQ}$ includes $\text{ID}_{REQ}$. $\text{Nonce}_{AAC}$ should be equal to a corresponding field in AACInit. Security capabilities$_{REQ}$ and $\text{ID}_{AS\_REQ}$ are optional fields.

In S705, the AAC performs, upon receiving REQInit, the following operations:

(1) checking whether $\text{Nonce}_{AAC}$ in REQInit is the same as $\text{Nonce}_{AAC}$ generated by the AAC, and if they are different, discarding REQInit;

(2) performing key exchange calculation according to the temporary private key corresponding to $\text{KeyInfo}_{AAC}$ and the temporary public key included in $\text{KeyInfo}_{REQ}$ to generate a first key K1, and calculating a message encryption key and a message integrity check key according to K1 in combination with $\text{Nonce}_{AAC}$, $\text{Nonce}_{REQ}$, and other information (other information used by the AAC and the REQ is the same, and is optional, such as a particular string, etc.) and by using a negotiated or preset key derivation algorithm, wherein the generating, by the AAC, the message integrity check key is an optional operation, and this step may be performed subsequently as required;

(3) using the message encryption key and the symmetric encryption algorithm to decrypt $\text{EncData}_{REQ}$ to obtain $\text{ID}_{REQ}$;

(4) generating a protection nonce $\text{Nonce}_{AACPub}$;

(5) using a public key of an encryption certificate to calculate an identity information ciphertext $\text{EncPub}_{AS}$; and (6) if REQInit carries $\text{ID}_{AS\_REQ}$ and AACInit carries $\text{ID}_{AS\_AAC}$, determining, by the AAC, whether an identifier of at least one identical authentication server is present in $\text{ID}_{AS\_REQ}$ and $\text{ID}_{AS\_AAC}$, wherein if so, i.e., in the case of non-roaming, the AAC determines, from the identifier of the at least one authentication server trusted by both the REQ and the AAC, a first authentication server participating in identity authentication;

and if not, i.e., in the case of roaming, the AAC needs to determine, according to $ID_{AS\_AAC}$, a first authentication server AS-AAC participating in identity authentication, and send $ID_{AS\_REQ}$ to AS-AAC, so that AS-AAC determines a second authentication server AS-REQ according to $ID_{AS\_REQ}$; or, if REQInit carries $ID_{AS\_REQ}$, but AACInit does not carry $ID_{AS\_AAC}$, determining, by the AAC, whether an identifier of at least one identical authentication server is present in $ID_{AS\_REQ}$ and authentication servers trusted by the AAC, wherein if so, i.e., in the case of non-roaming, the AAC determines, from the identifier of the at least one authentication server trusted by both the REQ and the AAC, a first authentication server participating in identity authentication, and if not, i.e., in the case of roaming, the AAC needs to determine, according to the authentication servers trusted thereby, a first authentication server AS-AAC participating in identity authentication, and send $ID_{AS\_REQ}$ to AS-AAC, so that AS-AAC determines a second authentication server AS-REQ according to $ID_{AS\_REQ}$.

It should be noted that a result determined in this embodiment is the case of roaming.

In S706, the AAC sends a first authentication request message AACVeri to AS-AAC.

The AACVeri includes $EncPub_{AS}$, $ID_{REQ}$, $Nonce_{REQ}$, and $ID_{AS\_REQ}$. $ID_{REQ}$, $Nonce_{REQ}$, and $ID_{AS\_REQ}$ should be respectively equal to corresponding fields in REQInit. To-be-encrypted data of $EncPub_{AS}$ includes $Cert_{AAC}$ and $Nonce_{AACPub}$. $ID_{AS\_REQ}$ is an optional field, and is used to cause AS-AAC to determine, according to $ID_{AS\_REQ}$, the authentication server trusted by the REQ.

In S707, AS-AAC sends, upon receiving the AACVeri, a decryption request message AS-AACRReq to a Certificate Sever-Decrypt (CS-DEC).

The AS-AACReq includes $EncPub_{AS}$. The $EncPub_{AS}$ should be equal to a corresponding field in AACVeri.

In S708, the CS-DEC uses, upon receiving the AS-AACReq private key corresponding to the encryption certificate to decrypt $EncPub_{AS}$ to obtain $Cert_{AAC}$ and $Nonce_{AACPub}$.

In S709, the CS-DEC sends, a decryption response message CS-DECRep to AS-AAC.

The CS-DECReq includes $Cert_{AAC}$ and $Nonce_{AACpub}$, obtained by means of decryption:

In S710, AS-AAC performs, upon receiving the CS-DECRep, the following operations:

(1) verifying legality of $Cert_{AAC}$ to obtain $Res_{AAC}$, and generating $Pub_{AAC}$ according to information including $Cert_{AAC}$ and $Res_{AAC}$;

(2) performing an XOR operation on $Pub_{AAC}$ and $Nonce_{AACPub}$ to generate $Pub_{AAC\_hu} \oplus Nonce_{AACPub}$;

(3) calculating a digital signature $Sig_{AS\_AAC}$ of AS-AAC; and (4) if $IDS_{AS\_REQ}$ is present in AACVeri, determining, by AS-AAC, the second authentication server AS-REQ according to $ID_{AS\_REQ}$; if $ID_{AS\_REQ}$ is not present in AACVeri, it is indicated that AS-AAC has determined and learned AS-REQ.

In S711, AS-AAC sends a second authentication request message AS-AACVeri to AS-REQ.

The AS-AACVeri includes $ID_{REQ}$, $Nonce_{REQ}$, $Pub_{AAC} \oplus Nonce_{AACPub}$ and $Sig_{AS\_AAC}$. $ID_{REQ}$, $Nonce_{REQ}$, and $Nonce_{AACPub}$ should be respectively equal to corresponding fields in AACVeri. To-be-signed data of $Sig_{AS\_AAC}$ includes other fields before $Sig_{AS\_AAC}$ in AS-AACVeri.

In S712, AS-REQ performs, upon receiving AS-AACVeri, the following operations:

(1) using a public key of AS-AAC to verify $Sig_{AS\_AAC}$, and if verification is not successful, discarding AS-AACVeri; and (2) calculating a digital signature $Sig_{AS\_REQ}$ of AS-REQ.

In S713, AS-REQ sends a second authentication response message AS-REQVeri to AS-AAC.

The AS-REQVeri includes $ID_{REQ}$, $Nonce_{REQ}$, $Pub_{AAC} \oplus Nonce_{AACPub}$, and $Sig_{AS\_REQ}$. $ID_{REQ}$, $Nonce_{REQ}$, and $Pub_{AAC} \oplus Nonce_{AAC\_Pub}$ should be respectively equal to corresponding fields in AS-AACVeri. To-be-signed data of $Sig_{AS\_REQ}$ includes $ID_{REQ}$, $Nonce_{REQ}$, and $Pub_{AAC} \oplus Nonce_{AACPub}$.

In S714, AS-AAC sends, upon receiving AS-REQVeri, a first authentication response message ASVeri to the AAC.

The ASVeri includes $ID_{REQ}$, $Nonce_{REQ}$, $Pub_{AAC} \oplus Nonce_{AACPub}$, and $Sig_{AS\_REQ}$. $Nonce_{REQ}$, $Pub_{AAC} \oplus Nonce_{AACPub}$, and $Sig_{AS\_REQ}$ should be respectively equal to corresponding fields in AS-REQVeri.

In S715, the AAC performs, upon receiving ASVeri, the following operations:

(1) using the message encryption key and the symmetric encryption algorithm to calculate authentication result information $EncData_{AAC}$;

(2) calculating a digital signature $Sig_{AAC}$ of the AAC; and (3) calculating $MacTag_{AAC}$ as desired.

S716, the AAC sends an authentication result message AACAuth to the REQ.

The AACAuth includes $EncData_{AAC}$, $Sig_{AAC}$, and $MacTag_{AAC}$. To-be-encrypted data of $EncData_{AAC}$ includes $ID_{REQ}$, $Nonce_{REQ}$, $Pub_{AAC} \oplus Nonce_{AACPub}$, $Sig_{AS\_REQ}$, and $Nonce_{AACPub}$. $ID_{REQ}$, $Nonce_{REQ}$, $Pub_{AAC} \oplus Nonce_{AACPub}$, and $Sig_{AS\_REQ}$ should be respectively equal to corresponding fields in ASVeri. To-be-signed data of $Sig_{AAC}$ includes other fields before $Sig_{AAC}$ in AACAuth. $MacTag_{AAC}$ is an optional field. A calculation process of $MacTag_{AAC}$ is as described above.

In S717, the REQ receives the AACAuth, and then performs the following operations including:

(1) if $MacTag_{AAC}$ is present in AACAuth, verifying $MacTag_{AAC}$, wherein a verification process is as described above;

(2) using the message encryption key and the symmetric encryption algorithm to decrypt $EncData_{AAC}$ to obtain $ID_{REQ}$, $Nonce_{REQ}$, $Pub_{ACC} \oplus Nonce_{AACPub}$, $Sig_{AS\_REQ}$, and $Nonce_{AACPub}$;

(3) checking whether $Nonce_{REQ}$ and $ID_{REQ}$ are respectively the same as $Nonce_{REQ}$ generated by the REQ and the identifier ID REQ of the REQ itself;

(4) performing an XOR operation on $Nonce_{AACPub}$ and $Pub_{AAC} \oplus Nonce_{AACPub}$ to recover $Pub_{AAC}$;

(5) using $Cert_{AAC}$ in $Pub_{AAC}$ to verify $Sig_{AAC}$;

(6) using a public key of AS-REQ to verify $Sig_{AS\_REQ}$; and (7) after the above checking and verifications are successful, determining an identity authentication result of the AAC according to Res AAC in $Pub_{AAC}$, or if any step in the above checking and verifications is not successful, discarding AACAuth immediately.

Figure 8:
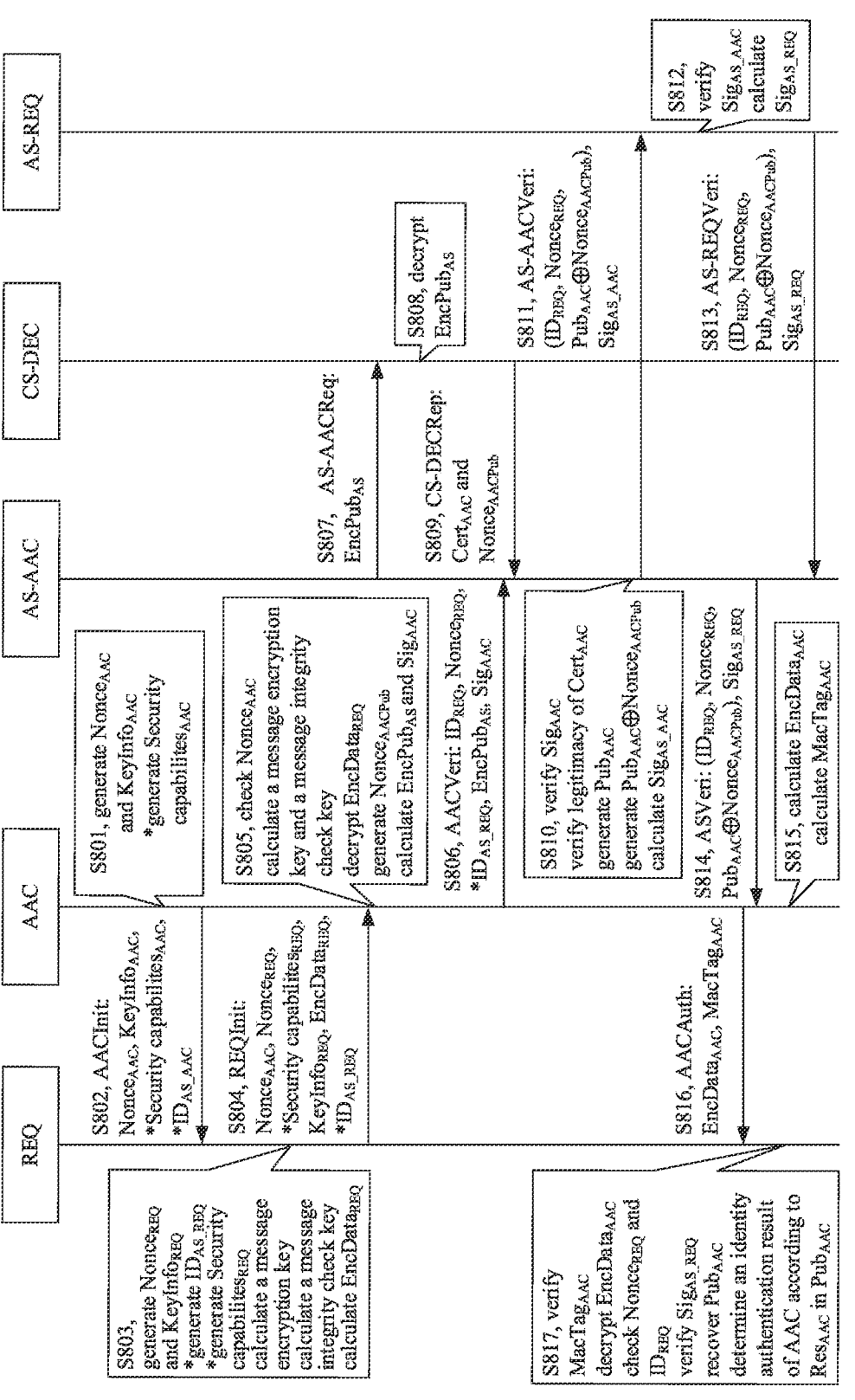
FIG. 8 is a schematic diagram of another method of identity authentication in the case of roaming according to an embodiment of the present application, where "*" represents an optional field or an optional operation.

Referring to FIG. 8, FIG. 8 is another embodiment of a method of identity authentication in the case of roaming. In the embodiment, a message encryption key negotiation process between a REQ and an AAC is fused into an identity authentication process, thereby facilitating project implementation. A digital signature $Sig_{AAC}$ of an AAC is verified by AS-AAC. The method includes the following operations.

In S801, an AAC generates $Nonce_{AAC}$ and $KeyInfo_{AAC}$, and generates Security capabilities$_{AAC}$ as needed.

In S802, the AAC sends a key request message AACInit to a REQ.

The AACInit includes $Nonce_{AAC}$, $KeyInfo_{AAC}$, Security capabilities$_{AAC}$, and $ID_{AS\_AAC}$. Security capabilities$_{AAC}$ and $ID_{AS\_AAC}$ are optional fields.

In S803, the REQ generates $Nonce_{REQ}$ and $KeyInfo_{REQ}$, generates $ID_{AS\_REQ}$ and Security capabilities$_{REQ}$ as desired, performs key exchange calculation according to a temporary private key corresponding to $KeyInfo_{REQ}$ and a temporary public key included in $KeyInfo_{AAC}$ to generate a first key K1, calculates a message encryption key and a message integrity check key according to K1 in combination with $Nonce_{AAC}$, $Nonce_{REQ}$, and other information (other information used by the REQ and the AAC is the same, and is optional, such as a particular string, etc.) and by using a negotiated or preset key derivation algorithm, and uses the message encryption key and a symmetric encryption algorithm to calculate an identifier ciphertext $EncData_{REQ}$ of the REQ.

In S804, the REQ sends a key response message REQInit to the AAC.

The REQInit includes $Nonce_{AAC}$, $Nonce_{REQ}$, Security capabilities$_{REQ}$, $KeyInfo_{REQ}$, $EncData_{REQ}$, and $ID_{AS\_REQ}$. To-be-encrypted data of $EncData_{REQ}$ includes $ID_{REQ}$. $Nonce_{AAC}$ should be equal to a corresponding field in AACInit. Security capabilities$_{REQ}$ and $ID_{AS\_REQ}$ are optional fields.

In S805, the AAC performs, upon receiving REQInit, the following operations:

(1) checking whether $Nonce_{AAC}$ in REQInit is the same as $Nonce_{AAC}$ generated by the AAC, and if they are different, discarding REQInit;

(2) performing key exchange calculation according to a temporary private key corresponding to $KeyInfo_{AAC}$ and a temporary public key included in $KeyInfo_{REQ}$ to generate a first key K1, and calculating a message encryption key and a message integrity check key according to K1 in combination with $Nonce_{AAC}$, $Nonce_{REQ}$, and other information (other information used by the AAC and the REQ is the same, and is optional, such as a particular string, etc.) and by using a negotiated or preset key derivation algorithm;

(3) using the message encryption key and the symmetric encryption algorithm to decrypt $EncData_{REQ}$ to obtain $ID_{REQ}$;

(4) generating a protection nonce $Nonce_{AACPub}$;

(5) using a public key of an encryption certificate to calculate an identity information ciphertext $EncPub_{AS}$;

(6) calculating a digital signature $Sig_{AAC}$ of the AAC;

(7) a method used by the AAC to determine AS-AAC being the same as that in Embodiment 7.

In S806, the AAC sends a first authentication request message AACVeri to AS-AAC.

The AACVeri includes $ID_{REQ}$, $Nonce_{REQ}$, $ID_{AS\_REQ}$, $EncPub_{AS}$, and $Sig_{AAC}$. $ID_{AS\_REQ}$ is an optional field, and $ID_{REQ}$, $Nonce_{REQ}$, and $ID_{AS\_REQ}$ should be respectively equal to corresponding fields in REQInit. To-be-encrypted data of $EncPub_{AS}$ includes $Cert_{AAC}$ and $Nonce_{AACPub}$. To-be-signed data of $Sig_{AAC}$ includes other fields before $Sig_{AAC}$ in AACVeri.

In S807, AS-AAC sends, upon receiving the AACVeri, a decryption request message AS-AACReq to a certificate sever-decrypt (CS-DEC).

The AS-AACReq includes $EncPub_{AS}$. The $EncPub_{AS}$ should be equal to a corresponding field in AACVeri.

In S808, the CS-DEC uses, upon receiving the AS-AACReq, a private key corresponding to the encryption certificate to decrypt $EncPub_{AS}$ to obtain $Cert_{AAC}$ and $Nonce_{AACPub}$.

In S809, the CS-DEC sends a decryption response message CS-DECRep to AS-AAC.

The CS-DECReq includes $Cert_{AAC}$ and $Nonce_{AACPub}$ obtained by means of decryption.

In S810, AS-AAC performs, upon receiving the CS-DECRep, the following operations:

(1) using $Cert_{AAC}$ to verify $Sig_{AAC}$, and if verification is not successful, discarding CS-DECRep;

(2) verifying legality of $Cert_{AAC}$ to obtain $Res_{AAC}$, and generating $Pub_{AAC}$ according to information including $Res_{AAC}$;

(3) performing an XOR operation on $Pub_{AAC}$ and $Nonce_{AACPub}$ to generate $Pub_{AAC} \oplus Nonce_{AACPub}$;

(4) a method used by AS-AAC to determine a second authentication server AS-REQ being the same as that in embodiment 7; and (5) calculating a digital signature $Sig_{AS\_AAC}$ of AS-AAC.

In S811, AS-AAC sends a second authentication request message AS-AACVeri to AS-REQ.

The AS-AACVeri includes $ID_{REQ}$, $Nonce_{REQ}$, $Pub_{AAC} \oplus Nonce_{AACPub}$ and $Sig_{AS\_AAC}$. $ID_{REQ}$, $Nonce_{REQ}$, and $Nonce_{AACPub}$ should be respectively equal to corresponding fields in AACVeri. To-be-signed data of $Sig_{AS\_AAC}$ includes other fields before $Sig_{AS\_AAC}$ in AS-AACVeri.

In S812, AS-REQ performs, upon receiving AS-AACVeri, the following operations:

(1) using a public key of AS-AAC to verify $Sig_{AS\_AAC}$, and if verification is not successful, discarding AS-AACVeri; and (2) calculating a digital signature $Sig_{AS\_REQ}$ of AS-REQ.

In S813, AS-REQ sends a second authentication response message AS-REQVeri to AS-AAC.

The AS-REQVeri includes $ID_{REQ}$, $Nonce_{REQ}$, $Pub_{AAC} \oplus Nonce_{AACPub}$, and $Sig_{AS\_REQ}$. $ID_{REQ}$, $Nonce_{REQ}$, and $Pub_{AAC} \oplus Nonce_{AACPub}$ should be respectively equal to corresponding fields in AS-AACVeri. To-be-signed data of $Sig_{AS\_REQ}$ includes $ID_{REQ}$, $Nonce_{REQ}$, and $Pub_{AAC} \oplus Nonce_{AACPub}$.

In S814, AS-AAC sends, upon receiving AS-REQVeri, a first authentication response message ASVeri to the AAC.

The ASVeri includes $ID_{REQ}$, $Nonce_{REQ}$, $Pub_{AAC} \oplus Nonce_{AACPub}$, and $Sig_{AS\_REQ}$. $ID_{REQ}$, $Nonce_{REQ}$, $Pub_{AAC} \oplus Nonce_{AACPub}$, and $Sig_{AS\_REQ}$ should be respectively equal to corresponding fields in AS-REQVeri.

In S815, the AAC performs, upon receiving ASVeri, the following operations:

(1) using the message encryption key and the symmetric encryption algorithm to calculate authentication result information $EncData_{AAC}$; and (2) calculating $MacTag_{AAC}$.

In S816, the AAC sends an authentication result message AACAuth to the REQ.

The AACAuth includes $EncData_{AAC}$ and $MacTag_{AAC}$. To-be-encrypted data of $EncData_{AAC}$ includes $ID_{REQ}$, $Nonce_{REQ}$, $Pub_{AAC} \oplus Nonce_{AACPub}$, $Sig_{AS\_REQ}$, and $Nonce_{AACPub}$, and $ID_{REQ}$, $Nonce_{REQ}$, $Pub_{AAC} \oplus Nonce_{AACPub}$, and $Sig_{AS\_REQ}$ should be respectively equal to corresponding fields in ASVeri. A calculation process of $MacTag_{AAC}$ is as described above.

In S817, the REQ receives the AACAuth, and then performs the following operations, including:

(1) verifying, $MacTag_{AAC}$, a verification process being as described above;

(2) using the message encryption key and the symmetric encryption algorithm to decrypt $EncData_{AAC}$ to obtain $ID_{REQ}$, $Nonce_{REQ}$, $Pub_{AAC} \oplus Nonce_{AACPub}$, $Sig_{AS\_REQ}$, and $Nonce_{AACPub}$;

(3) checking whether $Nonce_{REQ}$ and $ID_{REQ}$ are respectively the same as $Nonce_{REQ}$ generated by the REQ and the identifier $ID_{REQ}$ of the REQ itself;

(4) using a public key of AS-REQ to verify $Sig_{AS\_REQ}$; and (5) after the above checking and verifications are successful, performing an XOR operation on $Nonce_{AACPub}$ and $Pub_{AAC} \oplus Nonce_{AACPub}$, to recover $Pub_{AAC}$, and determining an identity authentication result of the AAC according to $Res_{AAC}$ in $Pub_{AAC}$; if any step in the above checking and verifications is not successful, discarding AACAuth immediately.

In each of the above embodiments, each message may also carry a hash value $HASH_{X\_Y}$. The hash value $HASH_{X\_Y}$ is obtained by sender entity X of sending the message using a hash algorithm to perform a calculation on a latest preceding message received from peer entity Y, and is used by peer entity Y to verify whether entity X has received the complete latest preceding message. $HASH_{REQ\_AAC}$ represents a hash value calculated by the REQ for a received latest preceding message sent by the AAC. $HASH_{AAC\_REQ}$ represents a hash value calculated by the AAC for a received latest preceding message sent by the REQ. $HASH_{AAC\_AS-AAC}$ represents a hash value calculated by the AAC for a received latest preceding message sent by AS-AAC. $HASH_{AS-AAC\_AAC}$ represents a hash value calculated by AS-AAC for a received latest preceding message sent by the AAC. $HASH_{AS-AAC\_AS-REQ}$ represents a hash value calculated by AS-AAC for a received latest preceding message sent by AS-REQ. $HASH_{AS-REQ\_AS-AAC}$ represents a hash value calculated by AS-REQ for a received latest preceding message sent by AS-AAC. If a message currently sent by sender entity X is a first message interacting between entity X and entity Y, it means that entity X has not received a preceding message sent by peer entity Y, then the $HASH_{X\_Y}$ in the message may not exist or is meaningless.

Correspondingly, after peer entity Y receives a message sent by entity X, if $HASH_{X\_Y}$ is included in the message, when entity Y has not sent a preceding message(s) to entity X, entity Y will ignore the $HASH_{X\_Y}$; and when entity Y has sent the preceding message(s) to entity X, entity Y will locally calculate a harsh value of the latest preceding message previously sent to entity X by using a hash algorithm, and compare the hash value with the $HASH_{X\_Y}$ carried in the received message. If they are consistent, subsequent steps will be performed, otherwise the message will be discarded or the authentication process terminated.

In the present invention, for entity X, the preceding message(s) sent by peer entity Y to entity X refers to a message(s) sent by peer entity Y to entity X and received before entity X sends message M to peer entity Y. The latest preceding message sent by peer entity Y to entity X refers to a latest message sent by peer entity Y to entity X and received before entity X sends message M to peer entity Y. If the message M sent by entity X to its peer entity Y is a first message for interaction between entity X and entity Y, there is no preceding message sent by peer entity Y to entity X before entity X sends the message M to its peer entity Y.

It should be noted that the optional fields and optional operations in the corresponding embodiments of FIGS. 5, 6, 7 and 8 described above are denoted by "*" in FIGS. 5, 6, 7 and 8 of the drawings. The order of the contents included in the messages involved in all the above embodiments is not limited, and unless otherwise specified, there is no limitation on the order in which a message receiver operates on related messages and processes the contents included in the messages after receiving the messages.

Figure 9:
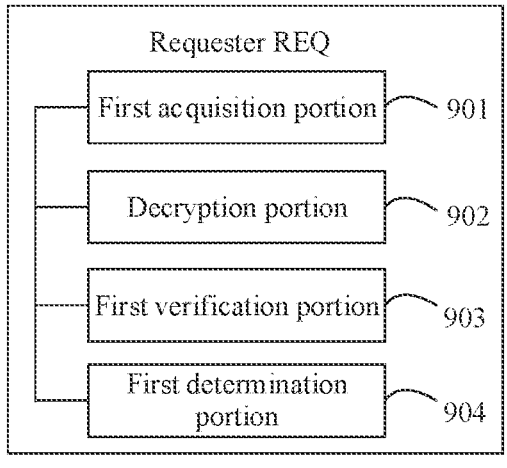
FIG. 9 is a structural block diagram of a requester REQ according to an embodiment of the present application.

On the basis of the method embodiments corresponding to FIGS. 1-8, referring to FIG. 9, provided in an embodiment of the present application is a requester REQ, including: a first acquisition portion 901, a decryption portion 902, a first verifying portion 903, and a first determination portion 904.

The first acquisition portion 901 is configured to acquire an authentication result message sent by the authentication access controller, the authentication result message comprising authentication result information that is obtained by the authentication access controller by using a message encryption key to encrypt to-be-encrypted data comprising an identity authentication result information ciphertext, a digital signature of a second authentication server trusted by the requester, and a protection nonce.

The identity authentication result information ciphertext is generated by a first authentication server trusted by the authentication access controller by using the protection nonce to encrypt information comprising identity authentication result information of the authentication access controller, and the identity authentication result information comprises a verification result of a digital certificate of the authentication access controller.

The decryption portion 902 is configured to use the message encryption key to decrypt the authentication result information to obtain the protection nonce, the identity authentication result information ciphertext, and the digital signature of the second authentication server.

The first verification portion 903 is configured to use a public key of the second authentication server to verify the digital signature of the second authentication server.

The decryption portion 902 is further configured to use the protection nonce to decrypt the identity authentication result information ciphertext to obtain the identity authentication result information of the authentication access controller when verification for the digital signature of the second authentication server is successful.

The first determination portion 904 is configured to determine an identity authentication result of the authentication access controller according to the verification result of the digital certificate in the identity authentication result information.

Optionally, the requester further comprises:

a second acquisition portion, configured to acquire a key request message sent by the authentication access controller, the key request message comprising a key exchange parameter of the authentication access controller;

a calculation portion, configured to perform key exchange calculation according to a temporary private key corresponding to a key exchange parameter of the requester and a temporary public key comprised in the key exchange parameter of the authentication access controller to generate a first key, and calculate, according to information comprising the first key, the message encryption key by using a key derivation algorithm; and a sending portion, configured to send a key response message to the authentication access controller, the key response message comprising the key exchange parameter of the requester.

Optionally, the key request message obtained by the second acquisition portion further comprises a first nonce generated by the authentication access controller, and the key response message sent by the sending portion further comprises a second nonce generated by the requester.

The calculation portion is further configured to calculate the message encryption key according to information comprising the first key, the first nonce, and the second nonce.

Optionally, the key response message sent by the sending portion further includes the first nonce.

Optionally, when the key response message sent by the sending portion further includes the second nonce, the to-be-encrypted data of the authentication result information in the authentication result message further includes the second nonce. The decryption portion 902 is further configured to decrypt the authentication result information to obtain the second nonce, and the first verification portion 903 is further configured to verify consistency between the second nonce obtained by the decryption portion 902 by means of decryption and the second nonce generated by the requester.

Optionally, the requester further comprises:

an encryption portion, configured to use the message encryption key to perform calculation on information including an identifier of the requester to obtain an identifier ciphertext. Correspondingly, the key response message sent by the sending portion further includes the identifier ciphertext.

Optionally, when the key response message sent by the sending portion further includes the identifier ciphertext, the to-be-encrypted data of the authentication result information in the authentication result message further includes the identifier of the requester. The decryption portion 902 is further configured to decrypt the authentication result information to obtain the identifier of the requester, and the first verification portion 903 is further configured to verify consistency between the identifier of the requester obtained by the decryption portion 902 by means of decryption and the identifier of the requester itself.

Optionally, the key request message acquired by the second acquisition portion further includes security capability parameter information supported by the authentication access controller, and the requester further includes:

a second determination portion, configured to determine, according to the security capability parameter information, a particular security policy used by the requester. Correspondingly, the key response message sent by the sending portion further includes the particular security policy.

Optionally, the authentication result message acquired by the first acquisition portion 901 further includes a message integrity check code calculated by the authentication access controller, and the requester further includes:

a second verification portion, configured to use a message integrity check key to verify the message integrity check code, wherein the message integrity check key and the message encryption key are generated in the same manner.

Optionally, the key request message acquired by the second acquisition portion further comprises an identifier of at least one authentication server trusted by the authentication access controller, and the requester further comprises:

a third determination portion, configured to determine, according to the identifier of the at least one authentication server trusted by the authentication access controller, an identifier of at least one authentication server trusted by the requester.

The key response message sent by the sending portion further includes the identifier of the at least one authentication server trusted by the requester.

Optionally, the key response message sent by the sending portion further includes the identifier of the at least one authentication server trusted by the requester.

Optionally, the first determination portion 904 is further configured to determine, before determining the identity authentication result of the authentication access controller, whether verification for a digital signature of the authentication access controller is successful, and responsive to determining that the verification for the digital signature of the authentication access controller is successful, further determine the identity authentication result of the authentication access controller according to the verification result of the digital certificate in the identity authentication result information.

Optionally, the first determination portion 904 is further configured to:

when a first authentication request message sent by the authentication access controller to the first authentication server comprises the digital signature of the authentication access controller, the first authentication server uses a digital certificate of the authentication access controller obtained by decrypting the identity information ciphertext in the first authentication request message to verify the digital signature of the authentication access controller, and responsive to that the first acquisition portion 901 receives the authentication result message, the first determination portion 904 is configured to determine that verification for the digital signature of the authentication access controller is successful; or when the authentication result message acquired by the first acquisition portion 901 further comprises the digital signature of the authentication access controller, and correspondingly, the identity authentication result information further comprise the digital certificate of the authentication access controller, the first determination portion 904 is further configured to use the digital certificate of the authentication access controller in the identity authentication result information to verify the digital signature of the authentication access controller, and determine, according to the verification result, whether verification for the digital signature of the authentication access controller is successful.

Optionally, the message sent by the requester to the authentication access controller further include a hash value calculated by the requester for a received latest preceding message sent by the authentication access controller.

Figure 10:
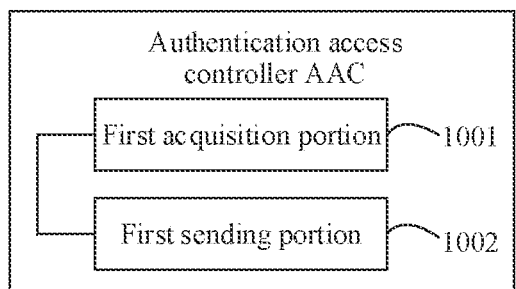
FIG. 10 is a structural block diagram of an authentication access controller AAC according to an embodiment of the present application.

On the basis of the method embodiments corresponding to FIGS. 1-8, referring to FIG. 10, provided in an embodiment of the present application is an authentication access controller AAC, including: a first acquisition portion 1001 and a first sending portion 1002.

The first acquisition portion 1001 is configured to acquire a first authentication response message sent by a first authentication server trusted by the authentication access controller, the first authentication response message comprising an identity authentication result information ciphertext and a digital signature of a second authentication server trusted by a requester. The identity authentication result information ciphertext is generated by the first authentication server by using a protection nonce to encrypt information comprising identity authentication result information of the authentication access controller, and the identity authentication result information includes a verification result of a digital certificate of the authentication access controller.

The first sending portion 1002 is configured to send an authentication result message to the requester, the authentication result message comprising authentication result information that is obtained by the authentication access controller by using a message encryption key to encrypt to-be-encrypted data comprising the identity authentication result information ciphertext, the digital signature of the second authentication server, and the protection nonce.

Optionally, the authentication access controller further comprises:

a second sending portion, configured to send a first authentication request message to the first authentication server, the first authentication request message comprising an identity information ciphertext that is obtained by the authentication access controller by using a public key of an encryption certificate to encrypt information comprising the digital certificate of the authentication access controller and the protection nonce.

Optionally, the authentication access controller further comprises:

a third sending portion, configured to send a key request message to the requester, the key request message comprising a key exchange parameter of the authentication access controller;

a second acquisition portion, configured to acquire a key response message sent by the requester, the key response message comprising a key exchange parameter of the requester; and a calculation portion, configured to perform key exchange calculation according to a temporary private key corresponding to the key exchange parameter of the authentication access controller and a temporary public key comprised in the key exchange parameter of the requester to generate a first key, and calculate, according to information comprising the first key, the message encryption key by using a key derivation algorithm.

Optionally, the key request message sent by the third sending portion further comprises a first nonce generated by the authentication access controller, and the key response message acquired by the second acquisition portion further comprises a second nonce generated by the requester.

The calculation portion is further configured to calculate the message encryption key according to information comprising the first key, the first nonce, and the second nonce.

Optionally, the key response message acquired by the second acquisition portion further comprises the first nonce, and the authentication access controller further comprises:

a verification portion, configured to verity consistency between the first nonce in the key response message and the first nonce generated by the authentication access controller.

Optionally, the key response message acquired by the second acquisition portion further comprises an identifier ciphertext generated by the requester, and the authentication access controller further comprises: a decryption portion, configured to use the message encryption key to decrypt the identifier ciphertext to obtain an identifier of the requester.

Optionally, the key request message sent by the third sending portion further comprises security capability parameter information supported by the authentication access controller, and the key response message acquired by the second acquisition portion further comprises a particular security policy used by the requester and determined by the requester according to the security capability parameter information.

Optionally, the authentication result message sent by the first sending portion 1002 further comprises a message integrity check code that is generated by the authentication access controller by using a message integrity check key to perform calculation on fields, other than the message integrity check code, in the authentication result message. The message integrity check key of the authentication access controller and the message encryption key are generated in the same manner.

Optionally, the key request message sent by the third sending portion further comprises an identifier of at least one authentication server trusted by the authentication access controller, and the key response message acquired by the second acquisition portion further comprises an identifier of at least one authentication server trusted by the requester. The authentication access controller further comprises:

a first determination portion, configured to determine, according to the identifier of the at least one authentication server trusted by the requester and the identifier of the at least one authentication server trusted by the authentication access controller in the key request message, the first authentication server participating in an identity authentication process.

Optionally, the key response message acquired by the second acquisition portion further includes an identifier of at least one authentication server trusted by the requester, and the authentication access controller further includes:

a second determination portion, configured to determine, according to the identifier of the at least one authentication server trusted by the requester and an identifier of an authentication server trusted by the authentication access controller, the first authentication server participating in an identity authentication process.

Optionally, a message seat by the authentication access controller to the requester further include a hash value calculated by the authentication access controller for a received latest preceding message sent by the requester, and a message sent by the authentication access controller to the first authentication server further comprises a hash value calculated by the authentication access controller for a received latest preceding message sent by the first authentication serer.

Figure 11:
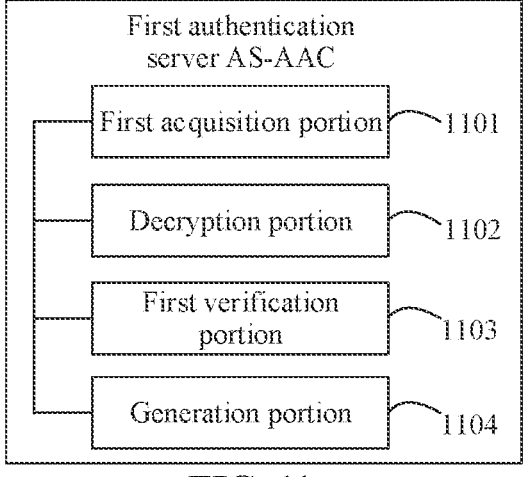
FIG. 11 is a structural block diagram of a first authentication server AS-AAC according to an embodiment of the present application.

On the basis of the method embodiments corresponding to FIGS. 1-8, referring to FIG. 11, further provided in an embodiment of the present application is a first authentication server AS-AAC. The first authentication server is an authentication server trusted by the authentication access controller shown in FIG. 10, and includes: a first acquisition portion 1101, a decryption portion 1102, a first verification portion 1103, and a generation portion 1104.

The first acquisition portion 1101 is configured to acquire a first authentication request message sent by the authentication access controller, the first authentication request message comprising an identity information ciphertext that is obtained by the authentication access controller by using a public key of an encryption certificate to encrypt information comprising the digital certificate of the authentication access controller and the protection nonce.

The decryption portion 1102 is configured to use a private key corresponding to the encryption certificate to decrypt the identity information ciphertext to obtain the digital certificate and the protection nonce.

The first verification portion 1103 is configured to perform legality verification on the digital certificate to obtain a verification result of the digital certificate of the authentication access controller.

The generation portion 1104 is configured to generate identity authentication result information of the authentication access controller according to information comprising the verification result; and further configured to use the protection nonce to encrypt information comprising the identity authentication result information to generate the identity authentication result information ciphertext, and perform calculation on to-be-signed data comprising the identity authentication result information ciphertext to generate a digital signature of the first authentication server.

Optionally, when a second authentication server trusted by the requester and the first authentication server trusted by the authentication access controller are the same authentication server, the first authentication server further comprises:

a first sending portion, configured to send to the authentication access controller a first authentication response message comprising the identity authentication result information ciphertext and the digital signature of the first authentication server.

Optionally, when a second authentication server trusted by the requester and the first authentication server trusted by the authentication access controller are two different authentication servers, the first authentication server further comprises:

a second sending portion, configured to send a second authentication request message to the second authentication server, the second authentication request message comprising the identity authentication result information ciphertext and the digital signature of the first authentication server, wherein the second authentication server uses a public key of the first authentication server to verify the digital signature of the first authentication server, and after verification is successful, the second authentication server performs calculation on to-be-signed data comprising the identity authentication result information ciphertext to generate a digital signature of the second authentication server;

a second acquisition portion, configured to acquire a second authentication response message sent by the second authentication server, the second authentication response message comprising the identity authentication result information ciphertext and the digital signature of the second authentication server; and a third sending portion, configured to send to the authentication access controller a first authentication response message comprising the identity authentication result information ciphertext and the digital signature of the second authentication server.

Optionally, the first authentication request message acquired by the first acquisition portion 1101 further comprises a digital signature of the authentication access controller, and the first authentication server further comprises:

a second verification portion, configured to use the digital certificate obtained by the decryption portion 1102 to verify the digital signature of the authentication access controller.

Optionally, a message sent by the first authentication server to the authentication access controller further comprises a hash value calculated by the first authentication server for a received latest preceding message sent by the authentication access controller, and a message sent by the first authentication server to the second authentication server farther comprises a hash value calculated by the first authentication server for a received latest preceding message sent by the second authentication server.

It should be noted that in the embodiments of the present application and other embodiments, the "portion" may be part of a circuit(s), part of a processor(s), part of a program(s) or software, or the like, or may also be a unit, and may be modular or non-modular.

Figure 12:
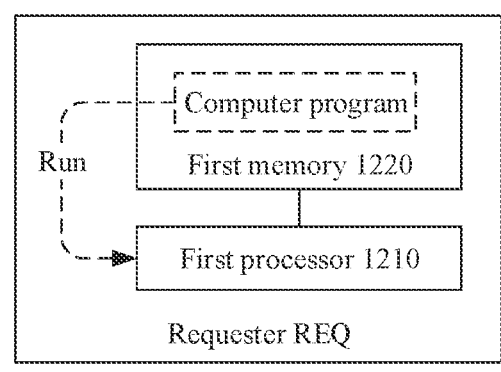
FIG. 12 is a block diagram of a hardware structure of a requester REQ according to an embodiment of the present application.

Referring to FIG. 12, further provided in an embodiment of the present application is a requester REQ, including: a first processor 1110 and a first memory 1120. The first processor 1110 can invoke and execute a computer program from the first memory 1120 to implement the steps performed by the REQ in the above embodiments.

The first memory 1120 may be a separate device independent of the first processor 1110, or may be integrated in the first processor 1110.

It should be understood that the requester may implement the respective processes implemented by the REQ in various methods of the embodiments of the present application, which are not described herein again for brevity.

Figure 13:
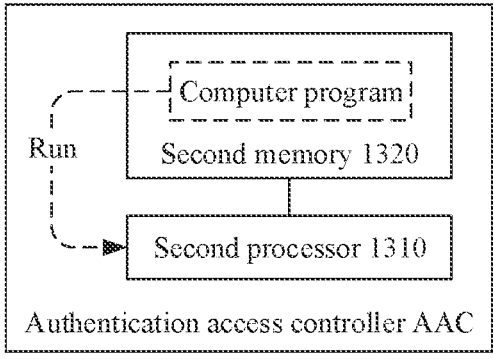
FIG. 13 is a block diagram of a hardware structure of an authentication access controller AAC according to an embodiment of the present application.

Referring to FIG. 13, further provided in an embodiment of the present application is an authentication access controller AAC, including: a second processor 1210 and a second memory 1220. The second processor 1210 can invoke and execute a computer program from the second memory 1220 to implement the steps performed by the AAC in the above embodiments.

The second memory 1220 may be a separate device independent of the second processor 1210, or may be integrated in the second processor 1210.

It should be understood that the authentication access controller may implement the respective processes implemented by the AAC in various methods of the embodiments of the present application, which are not described herein again for brevity.

Figure 14:
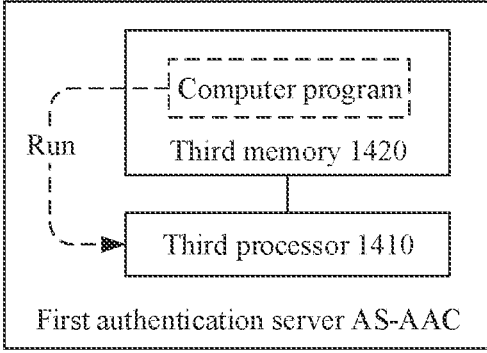
FIG. 14 is a block diagram of a hardware structure of a first authentication server AS-AAC according to an embodiment of the present application.

Referring to FIG. 14, further provided in an embodiment of the present application is a first authentication server AS-AAC, including: a third processor 1310 and a third memory 1320. The third processor 1310 can invoke and execute a computer program from the third memory 1320 to implement the steps performed by AS-AAC in the above embodiments.

The third memory 1320 may be a separate device independent of the third processor 1310, or may be integrated in the third processor 1310.

It should be understood that the first authentication server may implement the respective processes implemented by the AS-AAC in various methods of the embodiments of the present application, which are not described herein again for brevity.

A computer-readable storage medium is further provided in an embodiment of the present application. The computer-readable storage medium stores thereon a computer program that, when run by a processor, performs the steps performed by the authentication access controller AAC, the requester REQ, or the first authentication server AS-AAC in the method of identity authentication described above. The storage medium may be a volatile or non-volatile computer-readable storage medium.

It should be noted that the storage medium may be at least one of a read-only memory (ROM), a RAM, a magnetic or optical disk, and other media that may store program codes.

Further provided in an embodiment of the present application is a computer program, including computer-readable codes. When the computer-readable codes are ran in an electronic device, a processor in the electronic device performs steps performed by the authentication access controller AAC, the requester REQ, or the first authentication server AS-AAC in the above method of identity authentication.

A computer program product is further provided in an embodiment of the present application. The computer program product comprises computer program instructions, which may be used to perform the steps performed by the authentication access controller AAC, the requester REQ, or the first authentication server AS-AAC in the method of identity authentication described above. Reference may be made to the above-mentioned method embodiments for details, which are not described herein again.

It should be noted that various embodiments in the description are described in a progressive manner, the same and similar parts of each embodiment may be referred to each other, and each embodiment focuses on the differences from other embodiments. In particular, for device and system embodiments, since they are consistent and corresponding to the method embodiments, they are relatively simply described, and reference may be made to part of the description of the method embodiments for related parts. The device and system embodiments described above are only illustrative, wherein the parts described as separate components may or may not be physically separated, and the components displayed as parts may or may not be physical parts, that is, they may be located in one place, or may be distributed to a plurality of network parts. A part or all of the modules may be selected according to actual needs to achieve the objective of the solutions of the present embodiments. A person of ordinary skill in the art may understand and implement the solutions without any creative effort.

The detailed descriptions of the present application are merely described above, but the scope of protection of the present application is not limited thereto. Any person skilled in the art can easily conceive of changes or substitutions within the technical scope disclosed in the present application, and all of the changes or substitutions should be covered by the scope of protection of the present application. Therefore, the scope of protection of the present application should be defined by the scope of protection of the claims.

Industrial Applicability

In the method of identity authentication provided in the embodiments of the present application, during identity authentication performed for an authentication access controller by a requester, confidentiality processing can be performed on identity information carrying, private or sensitive information and identity authentication result information, so that even if an attacker intercepts an exchanged message during transmission, the attacker cannot acquire the private or sensitive information therein, thereby preventing the attacker from focusing on attacking a legal authentication access controller, and ensuring the security of an authentication access controller, a requester, and even a network.

The invention claimed is:

1. A method of identity authentication, comprising:
acquiring, by an authentication access controller, a first authentication response message from a first authentication server trusted thereby, the first authentication response message comprising an identity authentication result information ciphertext and a digital signature of a second authentication server trusted by a requester, wherein the identity authentication result information ciphertext is generated by the first authentication server by using a protection nonce to encrypt information comprising identity authentication result information of the authentication access controller, and the identity authentication result information comprises a verification result of a digital certificate of the authentication access controller;
acquiring, by the requester, an authentication result message sent by the authentication access controller, the authentication result message comprising authentication result information that is obtained by the authentication access controller by using a message encryption key to encrypt to-be-encrypted data comprising the identity authentication result information ciphertext, the digital signature of the second authentication server, and the protection nonce;
using, by the requester, the message encryption key to decrypt the authentication result information to obtain the protection nonce, the identity authentication result information ciphertext, and the digital signature of the second authentication server;
using, by the requester, a public key of the second authentication server to verify the digital signature of the second authentication server; after verification is successful;
using, by the requester, the protection nonce to decrypt the identity authentication result information ciphertext to obtain identity authentication result information of the authentication access controller; and
determining, by the requester, an identity authentication result of the authentication access controller according to a verification result of the digital certificate in the identity authentication result information.

2. The method according to claim 1, wherein before acquiring, by the authentication access controller, the first authentication response message from the first authentication server trusted thereby, the method further comprises:
sending, by the authentication access controller, a first authentication request message to the first authentication server, the first authentication request message comprising an identity information ciphertext that is obtained by the authentication access controller by using a public key of an encryption certificate to encrypt information comprising the digital certificate of the authentication access controller and the protection nonce.

3. The method according to claim 2, wherein before determining, by the requester, the identity authentication result of the authentication access controller, the method further comprises:
determining, by the requester, whether verification for a digital signature of the authentication access controller is successful, and responsive to determining that the verification for the digital signature of the authentication access controller is successful, determining, by the requester, the identity authentication result of the authentication access controller according to the verification result of the digital certificate in the identity authentication result information.

4. The method according to claim 3, wherein determining, by the requester, whether verification for the digital signature of the authentication access controller is successful comprises:
when the first authentication request message further comprises the digital signature of the authentication access controller, using, by the first authentication server, the digital certificate of the authentication access controller obtained by decrypting the identity information ciphertext in the first authentication request message to verify the digital signature of the authentication access controller, and responsive to that the requester receives the authentication result message, determining, by the requester, the verification for the digital signature of the authentication access controller is successful; or
when the authentication result message further comprises the digital signature of the authentication access controller, and correspondingly, the identity authentication result information further comprises the digital certificate of the authentication access controller;

and then using, by the requester, the digital certificate of the authentication access controller in the identity authentication result information to verify the digital signature of the authentication access controller, and determining, according to a verification result of the digital signature of the authentication access controller, whether the verification for the digital signature of the authentication access controller is successful.

5. The method according to claim 2, wherein before sending, by the authentication access controller, the first authentication request message to the first authentication server, the method further comprises:

sending, by the authentication access controller, a key request message to the requester, the key request message comprising a key exchange parameter of the authentication access controller;

performing, by the requester, key exchange calculation according to a temporary private key corresponding to a key exchange parameter of the requester and a temporary public key comprised in the key exchange parameter of the authentication access controller to generate a first key, and calculating, according to information comprising the first key, the message encryption key by using a key derivation algorithm;

sending, by the requester, a key response message to the authentication access controller, the key response message comprising the key exchange parameter of the requester; and performing, by the authentication access controller, key exchange calculation according to a temporary private key corresponding to the key exchange parameter of the authentication access controller and a temporary public key comprised in the key exchange parameter of the requester to generate the first key, and calculating, according to information comprising the first key, the message encryption key by using the key derivation algorithm.

6. The method according to claim 5, wherein the key request message further comprises a first nonce generated by the authentication access controller, and the calculating, by the requester, the message encryption key further comprises:

calculating, by the requester, the message encryption key according to information comprising the first key, the first nonce, and a second nonce generated by the requester, correspondingly, the key response message further comprises the second nonce, and the calculating, by the authentication access controller, the message encryption key further comprises:

calculating, by the authentication access controller, the message encryption key according to information comprising the first key, the first nonce, and the second nonce.

7. The method according to claim 6, wherein the key response message further comprises the first nonce, and before calculating, by the authentication access controller, the message encryption key, the method further comprises:

verifying, by the authentication access controller, consistency between the first nonce in the key response message and the first nonce generated by the authentication access controller; and responsive to that verification is successful, performing, by the authentication access controller, a relevant step.

8. The method according to claim 6, wherein when the key response message further comprises the second nonce, correspondingly, the first authentication request message and the first authentication response message further comprise the second nonce, and to-be-encrypted data of the authentication result information further comprises the second nonce; and then, before determining, by the requester, the identity authentication result of the authentication access controller, the method further comprises:

using, by the requester, the message encryption key to decrypt the authentication result information to further obtain the second nonce; and verifying, by the requester, consistency between the second nonce obtained and the second nonce generated by the requester; and responsive to that verification is successful, performing, by the requester, a relevant step.

9. The method according to claim 5, wherein after calculating, by the requester, the message encryption key, the method further comprises:

using, by the requester, the calculated message encryption key to perform calculation on information comprising an identifier of the requester to obtain an identifier ciphertext, correspondingly, the key response message further comprises the identifier ciphertext, and after calculating, by the authentication access controller, the message encryption key, the method further comprises:

using, by the authentication access controller, the calculated message encryption key to decrypt the identifier ciphertext to obtain the identifier of the requester.

10. The method according to claim 9, wherein when the authentication access controller obtains the identifier of the requester, correspondingly the first authentication request message and the first authentication response message further comprise the identifier of the requester, and the to-be-encrypted data of the authentication result information further comprises the identifier of the requester; and then before determining, by the requester, the identity authentication result of the authentication access controller, the method further comprises:

using, by the requester, the message encryption key to decrypt the authentication result information to further obtain the identifier of the requester; and verifying, by the requester, consistency between the identifier of the requester obtained and the identifier of the requester itself; and responsive to that verification is successful, performing, by the requester, a relevant step.

11. The method according to claim 5, wherein the key request message further comprises security capability parameter information supported by the authentication access controller, and the method further comprises:

determining, by the requester according to the security capability parameter information, a particular security policy used by the requester, correspondingly, the key response message further comprising the particular security policy.

12. The method according to claim 5, wherein the authentication result message further comprises a message integrity check code that is generated by the authentication access controller by using a message integrity check key to perform calculation on fields, other than the message integrity check code, in the authentication result message, wherein the message integrity check key of the authentication access controller and the message encryption key of the authentication access controller are generated in the same manner, and the method further comprises:

upon acquiring the authentication result message, using, by the requester, the message integrity check key to verify the message integrity check code, and performing a relevant step responsive to that verification is successful, wherein the message integrity check key of the requester and the message encryption key of the requester are generated in the same manner.

13. The method according to claim 5, wherein the key request message further comprises an identifier of at least one authentication server trusted by the authentication access controller, and the method further comprises:

determining, by the requester according to the identifier of the at least one authentication server trusted by the authentication access controller, an identifier of at least one authentication server trusted by the requester, wherein the key response message further comprises the identifier of the at least one authentication server trusted by the requester, and the method further comprises:

determining, by the authentication access controller according to the identifier of the at least one authentication server trusted by the requester and the identifier of the at least one authentication server trusted by the authentication access controller in the key request message, the first authentication server participating in an identity authentication process.

14. The method according to claim 5, wherein the key response message further comprises an identifier of at least one authentication server trusted by the requester, and the method further comprises:

determining, by the authentication access controller according to the identifier of the at least one authentication server trusted by the requester and an identifier of an authentication server trusted by the authentication access controller, the first authentication server participating in an identity authentication process.

15. The method according to claim 2, wherein when the second authentication server and the first authentication server are the same authentication server, the method further comprises:

acquiring, by the first authentication server, the digital certificate and the protection nonce obtained by using a private key corresponding to the encryption certificate to decrypt the identity information ciphertext, performing legality verification on the digital certificate to obtain the verification result of the digital certificate of the authentication access controller, and generating the identity authentication result information of the authentication access controller according to information comprising the verification result of the digital certificate of the authentication access controller; and using, by the first authentication server, the protection nonce to perform calculation on information comprising the identity authentication result information to generate the identity authentication result information ciphertext, performing calculation on to-be-signed data comprising the identity authentication result information ciphertext to generate a digital signature of the first authentication server, and generating the first authentication response message according to information comprising the identity authentication result information ciphertext and the digital signature of the first authentication server, correspondingly, the digital signature of the second authentication server trusted by the requester in the first authentication response message being the digital signature of the first authentication server.

16. The method according to claim 2, wherein when the second authentication server and the first authentication server are two different authentication servers, the method further comprises:

acquiring, by the first authentication server, the digital certificate and the protection nonce obtained by using a private key corresponding to the encryption certificate to decrypt the identity information ciphertext, performing legality verification on the digital certificate to obtain the verification result of the digital certificate of the authentication access controller, and generating the identity authentication result information of the authentication access controller according to information comprising the verification result of the digital certificate of the authentication access controller, using the protection nonce to perform calculation on information comprising the identity authentication result information to generate the identity authentication result information ciphertext, and performing calculation on to-be-signed data comprising the identity authentication result information ciphertext to generate a digital signature of the first authentication server;

sending, by the first authentication server, a second authentication request message to the second authentication server trusted by the requester, the second authentication request message comprising the identity authentication result information ciphertext and the digital signature of the first authentication server; using, by the second authentication server, a public key of the first authentication server to verify the digital signature of the first authentication server, and after verification is successful, performing calculation on to-be-signed data comprising the identity authentication result information ciphertext to generate the digital signature of the second authentication server;

receiving, by the first authentication server, a second authentication response message sent by the second authentication server, the second authentication response message comprising the identity authentication result information ciphertext and the digital signature of the second authentication server; and generating, by the first authentication server, the first authentication response message according to information comprising the identity authentication result information ciphertext and the digital signature of the second authentication server.

17. The method according to claim 1, wherein a message sent by the requester to the authentication access controller further comprises a hash value calculated by the requester for a received latest preceding message sent by the authentication access controller, and the method further comprises:

upon receiving the message sent by the requester, verifying, by the authentication access controller, the hash value in the received message first, and performing a subsequent operation after verification is successful;

wherein a message sent by the authentication access controller to the requester further comprises a hash value calculated by the authentication access controller for a received latest preceding message sent by the requester, and the method further comprises:

upon receiving the message sent by the authentication access controller, verifying, by the requester, the hash value in the received message first, and performing a subsequent operation after verification is successful;

a message sent by the authentication access controller to the first authentication server further comprises a hash value calculated by the authentication access controller for a received latest preceding message sent by the first authentication server, and the method further comprises:

upon receiving the message sent by the authentication access controller, verifying, by the first authentication server, the hash value in the received message first, and performing a subsequent operation after verification is successful;

a message sent by the first authentication server to the authentication access controller further comprises a hash value calculated by the first authentication server for a received latest preceding message sent by the authentication access controller, and the method further comprises:

upon receiving the message sent by the first authentication server, verifying, by the authentication access controller, the hash value in the received message first, and performing a subsequent operation after verification is successful;

a message sent by the first authentication server to the second authentication server further comprises a hash value calculated by the first authentication server for a received latest preceding message sent by the second authentication server, and the method further comprises:

upon receiving the message sent by the first authentication server, verifying, by the second authentication server, the hash value in the received message first, and performing a subsequent operation after verification is successful;

a message sent by the second authentication server to the first authentication server further comprises a hash value calculated by the second authentication server for a received latest preceding message sent by the first authentication server, and the method further comprises:

upon receiving the message sent by the second authentication server, verifying, by the first authentication server, the hash value in the received message first, and performing a subsequent operation after verification is successful.

18. A requester, comprising:

a processor; and a memory for storing instructions executable by the processor, wherein the processor is configured to:

acquire an authentication result message sent by an authentication access controller, the authentication access controller by using a message encryption key to encrypt to-be-encrypted data comprising an identity authentication result information ciphertext, a digital signature of a second authentication server trusted by the requester, and a protection nonce, wherein the identity authentication result information ciphertext is generated by a first authentication server trusted by the authentication access controller by using the protection nonce to encrypt information comprising identity authentication result information of the authentication access controller, and the identity authentication result information comprises a verification result of a digital certificate of the authentication access controller;

use the message encryption key to decrypt the authentication result information to obtain the protection nonce, the identity authentication result information ciphertext, and the digital signature of the second authentication server;

use a public key of the second authentication server to verify the digital signature of the second authentication server, wherein the decryption portion is further configured to use the protection nonce to decrypt the identity authentication result information ciphertext to obtain the identity authentication result information of the authentication access controller responsive to that verification for the digital signature of the second authentication server is successful; and determine an identity authentication result of the authentication access controller according to the verification result of the digital certificate in the identity authentication result information.

19. A first authentication server, trusted by an authentication access controller, the first authentication server comprising:

a processor; and a memory for storing instructions executable by the processor, wherein the processor is configured to:

acquire a first authentication request message sent by the authentication access controller, the first authentication request message comprising an identity information ciphertext that is obtained by the authentication access controller by using a public key of an encryption certificate to encrypt information comprising a digital certificate of the authentication access controller and a protection nonce;

use a private key corresponding to the encryption certificate to decrypt the identity information ciphertext to obtain the digital certificate and the protection nonce;

perform legality verification on the digital certificate to obtain a verification result of the digital certificate of the authentication access controller; and generate identity authentication result information of the authentication access controller according to information comprising the verification result, and further configured to use the protection nonce to encrypt information comprising the identity authentication result information to generate the identity authentication result information ciphertext, and perform calculation on to-be-signed data comprising the identity authentication result information ciphertext to generate a digital signature of the first authentication server.

* * * * *